(12) United States Patent
Lee

(10) Patent No.: US 12,248,336 B2
(45) Date of Patent: Mar. 11, 2025

(54) SLIDABLE DISPLAY DEVICE

(71) Applicant: SAMSUNG DISPLAY CO., LTD., Yongin-si (KR)

(72) Inventor: Won Beom Lee, Pyeongtaek-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 94 days.

(21) Appl. No.: 17/969,134

(22) Filed: Oct. 19, 2022

(65) Prior Publication Data
US 2023/0315145 A1 Oct. 5, 2023

(30) Foreign Application Priority Data

Mar. 21, 2022 (KR) .................. 10-2022-0034792

(51) Int. Cl.
G06F 1/16 (2006.01)
(52) U.S. Cl.
CPC .......... *G06F 1/1624* (2013.01); *G06F 1/1652* (2013.01); *G06F 1/1656* (2013.01)
(58) Field of Classification Search
CPC ..... G06F 1/1624; G06F 1/1652; G06F 1/1656
See application file for complete search history.

(56) References Cited

U.S. PATENT DOCUMENTS

| | | | | |
|---|---|---|---|---|
| 10,534,402 B1 * | 1/2020 | Kim | .................. | H05K 1/118 |
| 10,553,135 B2 * | 2/2020 | Lee | .................. | G09F 9/301 |
| 10,684,714 B2 * | 6/2020 | Seo | .................. | G06F 1/1652 |
| 10,747,269 B1 * | 8/2020 | Choi | .................. | H04M 1/0237 |
| 10,868,897 B2 * | 12/2020 | Cha | .................. | G06F 1/1652 |
| 10,985,333 B2 * | 4/2021 | Kim | .................. | H10K 50/84 |
| 11,003,219 B1 * | 5/2021 | Kim | .................. | G06F 1/1652 |
| 11,051,413 B2 * | 6/2021 | Yang | .................. | G06F 1/1624 |
| 11,314,285 B2 * | 4/2022 | Feng | .................. | G06F 1/1652 |
| 11,315,443 B2 * | 4/2022 | Han | .................. | G06F 1/1652 |
| 11,619,975 B2 * | 4/2023 | Cai | .................. | G06F 1/1652 361/679.01 |

(Continued)

FOREIGN PATENT DOCUMENTS

| | | |
|---|---|---|
| KR | 10-2016-0073466 | 6/2016 |
| KR | 10-2016-0141255 | 12/2016 |

(Continued)

*Primary Examiner* — Rockshana D Chowdhury
(74) *Attorney, Agent, or Firm* — F. CHAU & ASSOCIATES, LLC

(57) ABSTRACT

A display device includes: a display module having a flat area and a bendable area; and a sliding module configured to slide the display module in a first direction, wherein the sliding module includes: a central part including an upper central portion and a lower central portion, wherein the upper central portion is disposed under the flat area, and the lower central portion is disposed under the upper central portion; an upper expandable part configured to expand and contract and connected to the upper central portion; a roller connected to the upper expandable part; a first lower expandable part configured to expand and contract and connected to the lower central portion; and a second lower expandable part configured to expand and contract and connected to the first lower expandable part, wherein the second lower expandable part is connected to the bendable area.

20 Claims, 31 Drawing Sheets

(56) References Cited

U.S. PATENT DOCUMENTS

| | | | |
|---|---|---|---|
| 11,665,839 B2* | 5/2023 | Zeng | G06F 1/1652 |
| | | | 361/807 |
| 2004/0248073 A1* | 12/2004 | Pinkerman | G06F 1/1626 |
| | | | 345/204 |
| 2010/0175287 A1* | 7/2010 | Gupta | H04N 21/4122 |
| | | | 455/466 |
| 2018/0014417 A1* | 1/2018 | Seo | H05K 1/189 |
| 2018/0077808 A1* | 3/2018 | Seo | G06F 3/04164 |
| 2018/0102072 A1* | 4/2018 | Lee | G09F 9/301 |
| 2018/0188778 A1* | 7/2018 | Shin | G06F 1/1652 |
| 2020/0267246 A1* | 8/2020 | Song | H05K 1/148 |
| 2021/0120111 A1* | 4/2021 | Choi | G06F 1/1624 |
| 2021/0250432 A1* | 8/2021 | Lim | G06F 1/1686 |

FOREIGN PATENT DOCUMENTS

| | | |
|---|---|---|
| KR | 10-2018-0130076 | 12/2018 |
| KR | 10-2020-0004003 | 1/2020 |
| KR | 10-2022-0002775 | 1/2022 |

* cited by examiner

100: PNL, SP
PNL: AA, NAA, SBA
AA: AA_1, AA_2, AA_3
NAA: DM, BZ
SP: SG, MPL, SPL

ULK: UPL, UBV
BLK: BPL, BBV

MT: MTP, MGRA, MGRB
GR: 310, 330, 350
300: MT, GR
310: GRB1a, GRB1b, GRB1c, GRA1
330: GRB3a, GRB3b, GRB3c, GRA3
350: GRB5a, GRB5b, GRB5c, GRA5

SLIDABLE DISPLAY DEVICE

CROSS-REFERENCE TO RELATED APPLICATION

This application claims priority under 35 U.S.C. § 119 to Korean Patent Application No. 10-2022-0034792 filed on Mar. 21, 2022 in the Korean Intellectual Property Office, the disclosure of which is incorporated by reference herein in its entirety.

TECHNICAL FIELD

The present invention relates to a display device, and more particularly, to a slidable display device.

DISCUSSION OF THE RELATED ART

Display devices are constantly under development as multimedia technology evolves. In addition, a variety of types of display devices such as organic light-emitting display (OLED) devices and liquid-crystal display (LCD) devices are currently used.

Generally, display devices may include a display panel such as an organic light-emitting display panel and a liquid-crystal display panel for displaying images. Typically, a light-emitting display panel may include light-emitting elements. For example, light emitting elements may include light-emitting diodes (LEDs), which may include an organic light-emitting diode (OLED) using an organic material such as a fluorescent material, and an inorganic light-emitting diode using an inorganic material such as a fluorescent material.

Recently, as the display technology evolves, research and development on a display device having a flexible display panel are ongoing. The display screen of a flexible display can be extended or reduced by folding, bending or sliding the display screen, thereby contributing to the reduction of the volume or the design change of the display device.

SUMMARY

According to an embodiment of the present invention, a display device includes: a display module having a flat area and a bendable area, wherein the bendable area has a first side adjacent to the flat area in a first direction; and a sliding module at least partially surrounded by the display module and configured to slide the display module in the first direction, wherein the sliding module includes: a central part including an upper central portion and a lower central portion, wherein the upper central portion is disposed under the flat area of the display module, and the lower central portion is disposed under the upper central portion; an upper expandable part configured to expand and contract in the first direction and having a first side connected to the upper central portion of the central part; a roller connected to a second side, opposite to the first side, of the upper expandable part to bend the bendable area of the display module; a first lower expandable part configured to expand and contract in the first direction and having a first side connected to the lower central portion of the central part; and a second lower expandable part configured to expand and contract in the first direction and having a first side connected to a second side, opposite to the first side, of the first lower expandable part, wherein a second side, opposite to the first side, of the second lower expandable part is connected to a second side, opposite to the first side, of the bendable area.

In an embodiment of the present invention, the display module includes a display panel for displaying images and a panel support for supporting a lower surface of the display panel, wherein the display panel includes: a first active area; a second active area adjacent to the first active area in the first direction; and a dummy area disposed opposite to the first active area with the second active area therebetween, wherein the panel support includes: a main plate supporting the first active area; a plurality of segments supporting the second active area; and a sub-plate supporting the dummy area, and wherein the second side of the second lower expandable part is connected to the sub-plate.

In an embodiment of the present invention, the second side of the second lower expandable part and the sub-plate are connected to each other by an elastic member.

In an embodiment of the present invention, the sub-plate includes a through hole penetrating through the sub-plate, and wherein the elastic member is connected to the through hole.

In an embodiment of the present invention, an elastic force applied to the elastic member is kept constant according to a sliding behavior of the display module in the first direction.

In an embodiment of the present invention, the display device further includes: a gear driver disposed in the central part and configured to expand and contract each of the upper expandable part, the first lower expandable part and the second lower expandable part in the first direction.

In an embodiment of the present invention, an expandable length of the upper expandable part in the first direction, an expandable length of the first lower expandable part in the first direction, and an expandable length of the second lower expandable part in the first direction are substantially all equal to one another.

In an embodiment of the present invention, the gear driver includes: a motor unit; a first gear unit disposed at the upper central portion; a second gear unit disposed at the lower central portion; and a third gear unit connected to the motor unit and configured to transmit power to the first gear unit and the second gear unit, wherein the first gear unit is connected to the first side of the upper expandable part and configured to expand and contract the upper expandable part in the first direction, and wherein the second gear unit is connected to the first side of the first lower expandable part to expand and contract the first lower expandable part and the second lower expandable part in the first direction.

In an embodiment of the present invention, each of the upper expandable part, the first lower expandable part and the second lower expandable part includes a plurality of lower links and a plurality of upper links, wherein each of the plurality of lower links includes a lower plate extended in one direction, a first lower gear disposed at first end of the lower plate in the one direction and protruding from an upper surface of the lower plate, and a second lower gear disposed at a second end, opposite to the first end, in the one direction and protruding from the upper surface of the lower plate, wherein each of the plurality of upper links includes an upper plate extended in another direction crossing the one direction, a first upper gear disposed at a first end of the upper plate in the other direction and protruding from a lower surface of the upper plate, and a second upper gear disposed at a second end, opposite to the first end, in the other direction and protruding from the lower surface of the upper plate, wherein the upper expandable part, the first lower expandable part and the second lower expandable part include a same number of lower links as one another, and wherein the upper expandable part, the first lower expandable part and the second lower expandable part include a same number of upper links as one another.

In an embodiment of the present invention, the plurality of lower links includes a first lower link and a second lower link spaced apart from each other in the first direction, wherein the plurality of upper links includes a first upper link and a second upper link spaced apart from each other in the first direction, wherein the first lower link and the first upper link cross each other, wherein the second lower link and the second upper link cross each other, wherein the first lower gear of the first lower link is engaged with the second upper gear of the second upper link, and wherein the first upper gear of the first upper link is engaged with the second lower gear of the second lower link.

In an embodiment of the present invention, the display device further includes: a panel connecting member configured to connect the second side of the bendable area of the display module with the second side of the second lower expandable part, wherein the upper expandable part is configured such that a first side of the second lower link in the one direction and a first side of the second upper link in the other direction are fixed to the roller, and the second lower gear of the first lower link and the second upper gear of the first upper link are engaged with the first gear unit, wherein the first lower expandable part is configured such that the second lower gear of the first lower link and the second upper gear of the first upper link are engaged with the second gear unit, wherein the second lower expandable part is configured such that the first side of the second lower link in the one direction and the first side of the second upper link in the other direction are fixed to the panel connecting member, wherein the second lower gear of the first lower link of the second lower expandable part is engaged with the first upper gear of the second upper link of the first lower expandable part, and wherein the second upper gear of the first upper link of the second lower expandable part is engaged with the first lower gear of the second lower link of the first lower expandable part.

In an embodiment of the present invention, the display device further includes: a first fixing member configured to fix the second lower gear of the first lower link of the second lower expandable part to the first upper gear of the second upper link of the first lower expandable part; and a second fixing member configured to fix the second upper gear of the first upper link of the second lower expandable part to the first lower gear of the second lower link of the first lower expandable part.

In an embodiment of the present invention, the display device further includes: a guide rail fixed to the roller and extended in the first direction, wherein the first fixing member and the second fixing member are engaged with the guide rail.

In an embodiment of the present invention, a first angle of intersection formed by the first lower link and the first upper link of the upper expandable part, a second angle of intersection formed by the first lower link and the first upper link of the first lower expandable part, and a third angle of intersection formed by the first lower link and the first upper link of the second lower expandable part are substantially all equal to each other.

In an embodiment of the present invention, a rate of change of the first angle of intersection, a rate of change of the second angle of intersection, and a rate of change of the third angle of intersection that change according to a sliding behavior of the display module in the first direction are substantially all equal to each other.

According to an embodiment of the present invention, a display device includes: a display module having a flat area and a bendable area, wherein the bendable area has a first side adjacent to the flat area in a first direction; and a sliding module at least partially surrounded by the display module and configured to slide the display module in the first direction, wherein the sliding module includes: a central part including an upper central portion and a lower central portion, wherein the upper central portion is disposed under the flat area of the display module, and the lower central portion is disposed under the upper central portion; an upper expandable part configured to expand and contract in the first direction and having a first side connected to the upper central portion of the central part; a roller connected to a second side, opposite to the first side, of the upper expandable part and configured to bend the bendable area of the display module; and a lower expandable part configured to expand and contract in the first direction and having a first side connected to the lower central portion of the central part, wherein a second side, opposite to the first side, of the lower expandable part is connected to a second side, opposite to the first side, of the bendable area, and wherein an expandable length of the lower expandable part in the first direction is greater than an expandable length of the upper expandable part in the first direction.

In an embodiment of the present invention, the expandable length of the lower expandable part in the first direction is twice the expandable length of the upper expandable part in the first direction.

In an embodiment of the present invention, the display module includes a display panel for displaying images, and a panel support for supporting the display panel, wherein the display panel includes: a first active area; a second active area adjacent to the first active area in the first direction; and a dummy area disposed opposite to the first active area with the second active area therebetween, wherein the panel support includes: a main plate supporting the first active area; a plurality of segments supporting the second active area; and a sub-plate supporting the dummy area, and wherein the second side of the lower expandable part is connected to the sub-plate.

In an embodiment of the present invention, the second side of the lower expandable part and the sub-plate are connected with each other by an elastic member.

In an embodiment of the present invention, an elastic force applied to the elastic member is kept constant according to a sliding behavior of the display module in the first direction.

BRIEF DESCRIPTION OF THE DRAWINGS

The above and other features of the present invention will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as being limited to the embodiments set forth herein.

It will also be understood that when a layer is referred to as being "on" another layer or substrate, it can be directly on the other layer or substrate, or intervening layers may also be present. The same reference numbers may indicate the same components throughout the specification, and thus, repetitive descriptions may be omitted.

It will be understood that, although the terms "first," "second," etc. may be used herein to describe various elements, these elements should not be limited by these terms. These terms are only used to distinguish one element from another element. For instance, a first element discussed below could be termed a second element without departing from the spirit and scope of the present invention. Similarly, the second element could also be termed the first element.

Features of each of various embodiments of the present invention may be partially or entirely combined with each other and may technically variously interwork with each other, and respective embodiments may be implemented independently of each other or may be implemented together in association with each other.

Hereinafter, embodiments of the present invention will be described with reference to the accompanying drawings.

Figure 1:
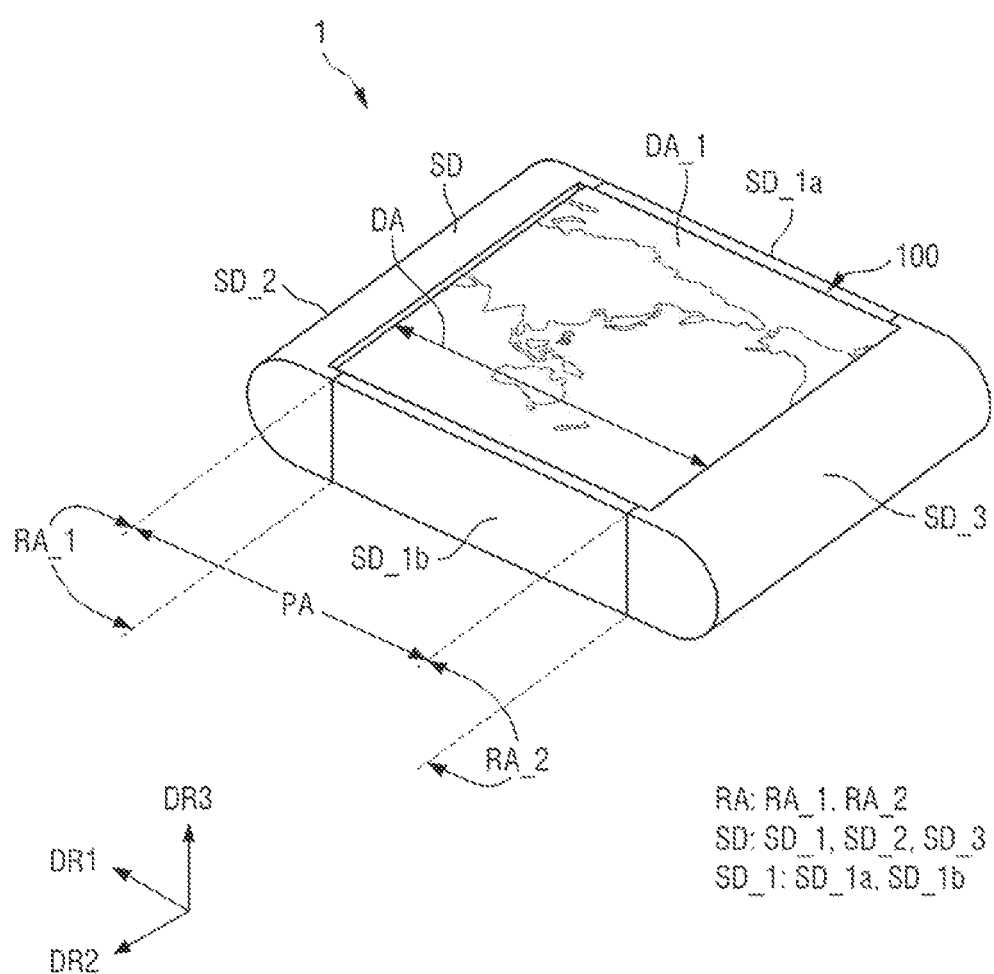
FIG. 1 is a perspective view showing a display device according to an embodiment of the present invention.
Figure 2:
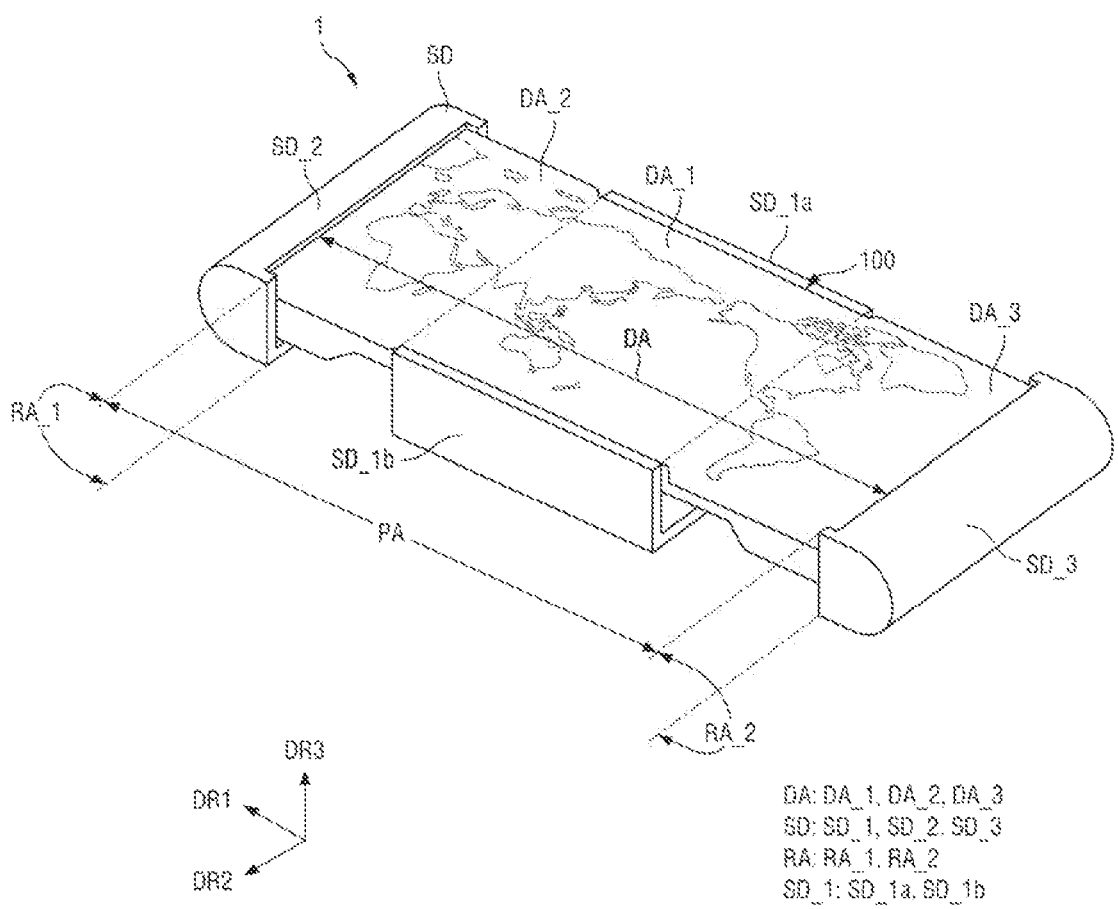
FIG. 2 is a perspective view of the display device according to an embodiment of the present invention when it is expanded.
Figure 3:
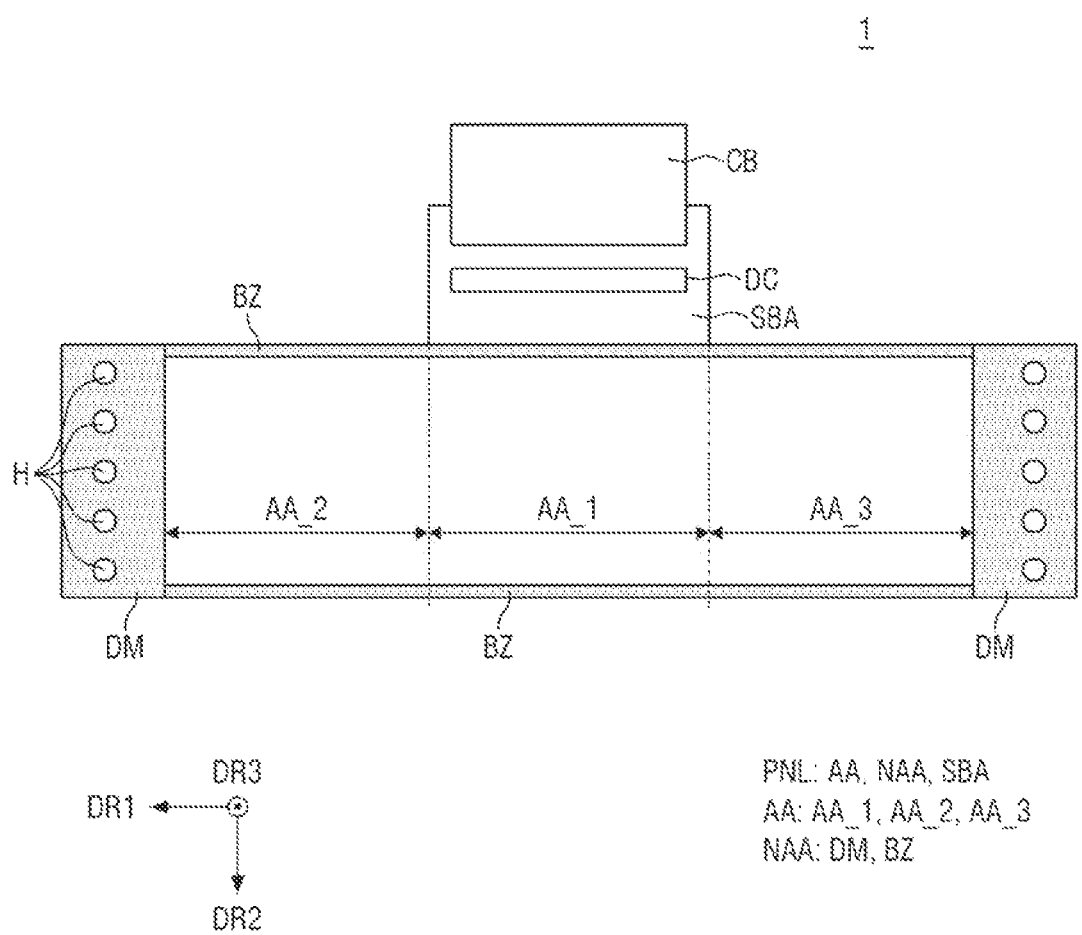
FIG. 3 is a plan view showing a display panel of a display device according to an embodiment of the present invention.
Figure 4:
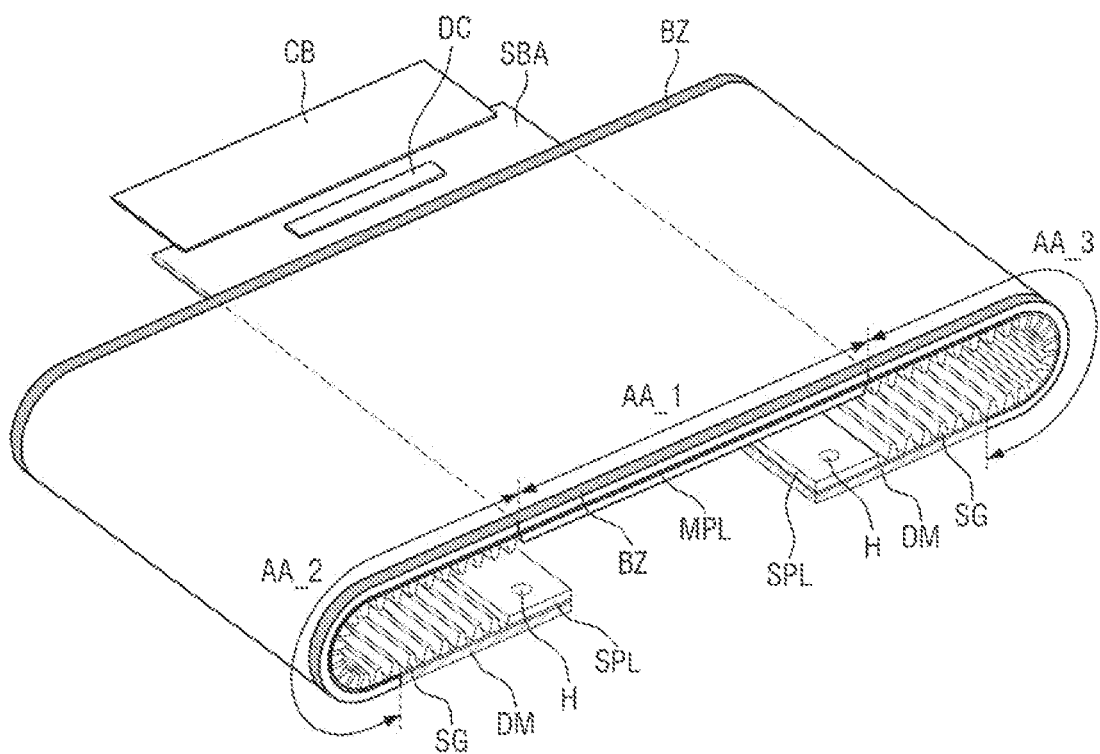
FIG. 4 is a perspective view showing a display module of the display device according to an embodiment of the present invention.
Figure 4:
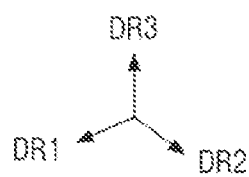
Figure 5:
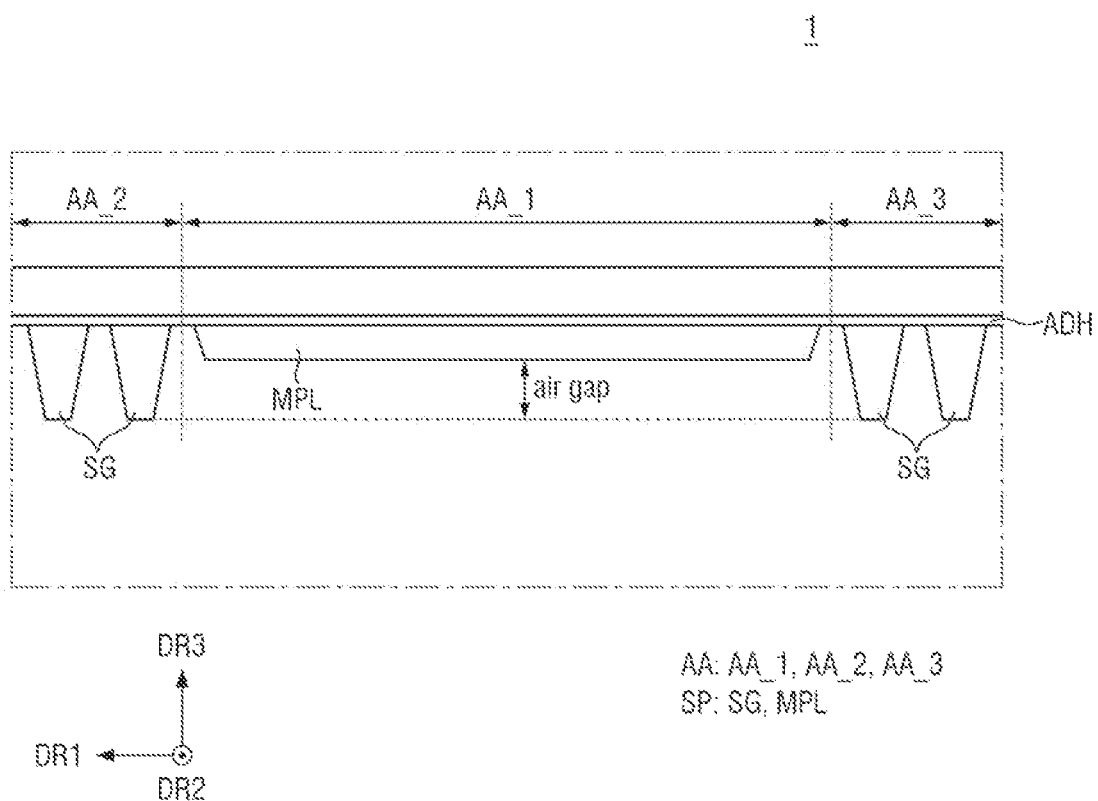
FIG. 5 is a view showing the arrangement relationship between the display panel and the panel support of the display module according to the embodiment of FIG. 4.
Figure 6:
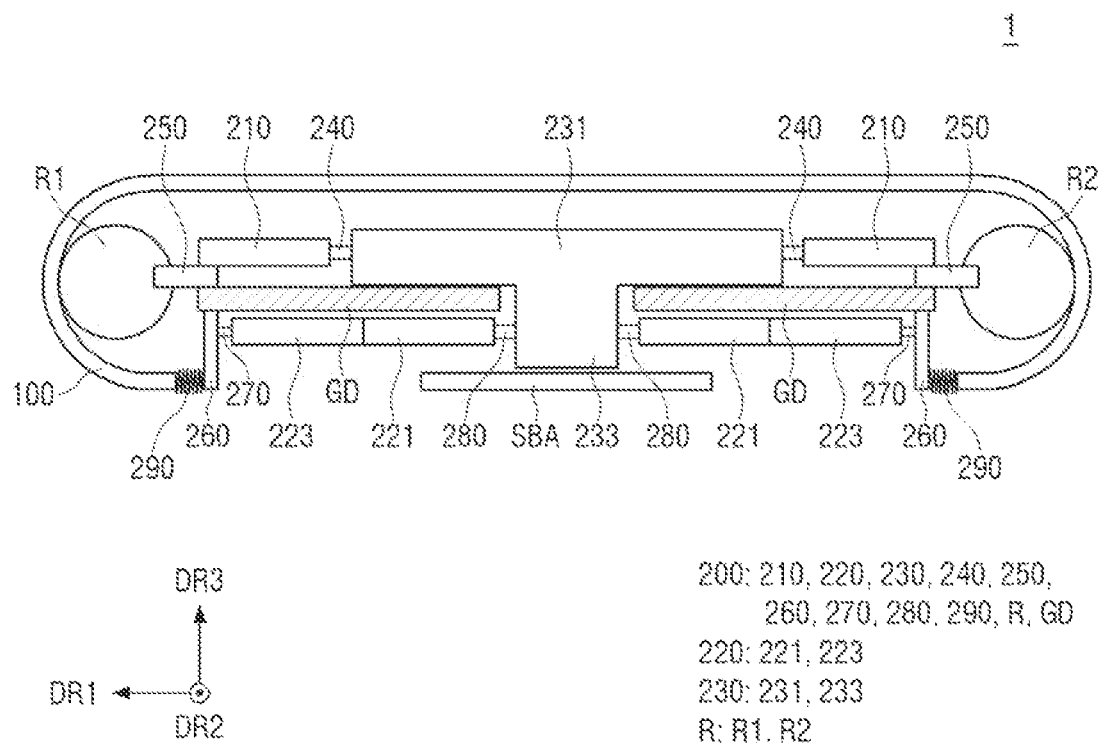
FIG. 6 is a view showing the arrangement relationship between the display module and the sliding module of the display device according to an embodiment of the present invention.

FIG. 1 is a perspective view showing a display device according to an embodiment of the present invention. FIG. 2 is a perspective view of the display device according to an embodiment of the present invention when it is expanded. FIG. 3 is a plan view showing a display panel of a display device according to an embodiment of the present invention. FIG. 4 is a perspective view showing a display module of the display device according to an embodiment of the present invention. FIG. 5 is a view showing the arrangement relationship between the display panel and the panel support of the display module according to the embodiment of FIG. 4. FIG. 6 is a view showing the arrangement relationship between the display module and the sliding module of the display device according to an embodiment of the present invention.

In FIG. 1, a first direction DR1, a second direction DR2 and a third direction DR3 are defined. The first direction DR1 and the second direction DR2 are substantially perpendicular to each other. The first direction DR1 and the third direction DR3 are substantially perpendicular to each other, and the second direction DR2 and the third direction DR3 are substantially perpendicular to each other. The first direction DR1 may refer to the horizontal direction in the drawings. The second direction DR2 may refer to the vertical direction in the drawings, and the third direction DR3 may refer to the up-and-down direction, e.g., the thickness direction in the drawings. For example, the first and second directions DR1 and DR2 may form a plane, and the third direction DR3 may be substantially perpendicular to the formed plane. As used herein, a direction may refer to the direction indicated by the arrow as well as the opposite direction, unless specifically stated otherwise. If it is necessary to discern between such two opposite directions, one of the two directions may be referred to as, for example, "a direction toward one side," while the other direction may be referred to as "a direction toward the opposite side." In FIG. 1, for example, the side indicated by the arrow of a direction may be referred to as one side in the direction, while the opposite side is referred to as the opposite side in the direction.

In the following description of the surfaces of the display device 1 or the elements of the display device 1, the surfaces facing one side where images are displayed, i.e., the third direction DR3 will be referred to as the upper surface, while the opposite surfaces will be referred to as the lower surface for convenience of illustration. It should be understood, however, that the disclosure is not limited thereto. The surfaces and the opposite surface of the elements may be referred to as a front surface and a rear surface, respectively, or may be referred to as a first surface and a second surface, respectively. In addition, in the description of relative positions of the elements of the display device 1, one side in the second direction DR2 may be referred to as the upper side while the opposite side in the third direction DR3 may be referred to as the lower side.

Referring to FIGS. 1 and 2, the display device 1 according to the embodiment may be a sliding display device or a slidable display device that can slide in the first direction DR1. The display device 1 according to the embodiment may be, but is not limited to, a multi-slidable display device that slides in two directions. For example, the display device 1 may be a single slideable display device that slides only in one direction. In the following description, a multi-slidable display device will be described as the display device 1 according to the embodiment.

The display device 1 may include a plane area PA and rounded areas RA. The plane area PA of the display device 1 generally overlaps with an open area of a panel storage SD where a display panel PNL is exposed, which will be described later. The rounded areas RA of the display device 1 may be located inside the panel storage SD. The rounded areas RA may be curved with a predetermined radius of curvature, and the display panel PNL may be curved according to the radius of curvature. The round areas RA may be disposed on both sides of the plane area PA in the first direction DR1, respectively. For example, a first round area RA_1 may be disposed on the opposite side of the plane area PA in the first direction DR1 while a second round area RA_2 may be disposed on one side of the plane area PA in the first direction DR1. In the first rounded area RA_1, a second active area AA_2 of the display panel PNL, which will be described later, may be bent. In the second rounded area RA_2, a third active area AA_3 of the display panel PNL, which will be described later, may be bent. As shown in FIG. 2, the plane area PA may increase as the display device 1 expands. Accordingly, the distance between the first rounded area RA_1 and the second rounded area RA_2 may increase.

Referring to FIGS. 1 to 6, the display device 1 according to the embodiment may include a display module 100, a sliding module 200, and a panel storage SD. The sliding module 200 is a member for sliding the display module 100 in the first direction DR1, and the display module 100 may partially surround the sliding module 200 as shown in FIG. 5.

The display module 100 may include a display panel PNL and a panel support SP. The display panel PNL displays images, and the panel support SP supports the display panel PNL.

The display panel PNL of the display module 100 displays images thereon. Any kind of display panel may be employed as the display panel PNL according to the embodiment, such as an organic light-emitting display panel including an organic light-emitting layer, a micro light-emitting diode display panel using micro LEDs, a quantum-dot light-emitting display panel using quantum-dot light-emitting diodes including quantum-dot light-emitting layer, and an inorganic light-emitting display panel using inorganic light-emitting elements including an inorganic semiconductor.

The display panel PNL may be a flexible panel. The display panel PNL may have flexibility so that it can be at least partially rolled, bent or curved in the panel storage SD, as will be described later. The display panel PNL may slide in the first direction DR1.

The display panel PNL may include an active area AA and a non-active area NAA.

In the active area AA of the display panel PNL, pixels may be disposed. The active area AA may include a first active are AA_1, a second active area AA_2, and a third active area AA_3. The first active area AA1 may be supported by a main plate MPL, which will be described later. The second active area AA_2 may be supported by a plurality of segments SG, and a third active area AA_3 may be supported by a plurality of segments SG. The first active area AA_1 of the display panel PNL may be always flat regardless of the sliding operation. Accordingly, the portion of the display module 100 overlapping with the first active area AA_1 of the display panel PNL may be always flat regardless of the sliding operation of the display device 1.

Each of the second active area AA_2 and the third active area AA_3 of the display panel PNL may be either a bent area that is rolled, bent or curved, or a bendable area changing between a rolled, bent or curved shape and a flat shape according to the sliding operation. Accordingly, the portions of the display module 100 overlapping the second active area AA_2 and the third active area AA_3 of the display panel PNL, respectively, may also be either bent areas or bendable areas changing between a rolled, bent or curved shape and a flat shape according to the sliding operation of the display device 1. The second active area AA_2 and the third active area AA_3 of the display panel PNL may be bent by rollers R of the sliding module 200 to be described later.

In the display area DA of the display panel PNL, images may be displayed. The display area DA may be divided into a first display area DA_1, a second display area DA_2 and a third display area DA_3 depending on whether the display panel PNL slides or not and on how long it slides if it does. The presence of the second display area DA_2 and the third display area DA_3 may depend on whether the display panel PNL slides or not, and the areas of them may vary depending on how long it slides. For example, when the display panel PNL does not slide, it has the first display area DA_1 having a first area. When the display panel PNL slides, the display area DA further includes the expanded second display area DA_2 and third display area DA_3 in addition to the first display area DA_1.

In the second display area DA_2, the second active area AA_2 of the display panel PNL and the plane area PA may overlap each other. In the third display area DA_3, the third active area AA_3 of the display panel PNL and the plane area PA may overlap each other.

The areas of the second display area DA_2 and the third display area DA_3 may vary depending on how long the display device 1 slides. When the display device 1 slides to the maximum, the second display area DA_2 has a second area, the third display area DA_3 has a third area, and the display area DA has a fourth area which is the sum of the first area, the second area and the third area. The fourth area may be the maximum area that the display area DA can have.

The first display area DA_1 may overlap with the first active area AA_1 of the display panel PNL. The second display area DA_2 may overlap with at least a part of the second active area AA_2 of the display panel PNL. The third display area DA_3 may overlap with at least a part of the third active area AA_3 of the display panel PNL. In an embodiment of the present invention, the boundary between the first display area DA_1 and the second display area DA_2 may coincide with the boundary between the first active area AA_1 and the second active area AA_2, and the boundary between the first display area DA_1 and the second display area DA_2 may coincide with the boundary between the first active area AA_1 and the third active area AA_3. However, the present invention is not limited thereto.

In the non-active area NAA of the display panel PNL, no pixel may be disposed. In the non-active area NAA, metal lines such as a data/scan lines, and touch lines may be disposed. The non-active area NAA may include a bezel area BZ and a dummy area DM. The non-active area NAA may be disposed to at least partially surround the active area AA.

The bezel area BZ may be disposed at opposing sides of the active area AA in the second direction DR2 as shown in FIG. 3. For example, the display panel PN may include a first bezel area and a second bezel area. The first bezel area may be disposed at a first side of the active area AA in the second direction DR2, and the second bezel area may be disposed at a second side, opposite to the first side, of the active area AA in the second direction DR2.

The dummy area DM may be disposed at both ends of the active area AA in the first direction DR1 as shown in FIG. 3. For example, the portion of the dummy area DM disposed at a first end of the second active area AA_2 in the first direction DR1 may be referred to as a first dummy area, and the portion of the dummy area DM disposed at a second end, opposite to the first end, of the third active area AA_3 in the first direction DR1 may be referred to as a second dummy area.

Metal lines such as scan/data lines, and touch lines may be disposed in the dummy area DM. Accordingly, the metal lines such as the scan/data lines and touch lines might not be disposed in the first bezel area or the second bezel area, so that the areas of the first bezel area and the second bezel area can be reduced and the active area AA can be increased.

The dummy area DM may slide or may be bent according to the behavior of the display device 1. For example, the dummy area DM may be included in the bendable area of the display panel PNL, and accordingly, the portion of the display module 100 overlapping with the dummy area DM may also be a bent area or a bendable area changing between a rolled, bent or curved shape and a flat shape according to the sliding operation of the display device 1. The ends or portions of the dummy area DM that are not adjacent to the second active area AA_2 or the third active area AA_3 may be the ends of the bent area or the bendable area of the display module 100. The dummy area DM may include a bent dummy area, which is supported by the plurality of segment bodies SG, and a flat dummy area, which is supported by sub-plates SPL, which will be described later.

The display panel PNL may include a subsidiary area SBA. The subsidiary area SBA may be disposed on the opposite side of the first active area AA_1 of the display panel PNL in the second direction DR2. The subsidiary area SBA may be a folded, curved or bent. When the subsidiary area SBA is bent, the subsidiary area SBA may be disposed in the space in which the second active area AA_2 and the third active area AA_3 of the display panel PNL are bent and may overlap with the first active area AA_1 in the third direction DR3. For example, when the subsidiary area SBA is bent, the subsidiary area SBA may overlap the first active area AA_1 in the third direction DR3. In addition, when the subsidiary area SBA is bent, it may surround and/or overlap a central part 230 disposed under the first active area AA_1 of the sliding module 200. The subsidiary area SBA may have, but is not limited to, a rectangular shape when viewed from the top.

In an embodiment of the present invention, the length of the subsidiary area SBA in the first direction DR1 may be substantially equal to the length of the first active area AA_1 in the first direction DR1. It should be understood, however, that the present invention is not limited thereto. In addition, the length of the subsidiary area SBA in the first direction DR1 may be smaller than the length of the first active area AA_1 in the first direction DR1. The length of the subsidiary area SBA in the second direction DR2 may be smaller than the length of the first active area AA_I in the second direction DR2.

A driver circuit DC and a circuit board CB may be disposed on one surface of the subsidiary area SBA in the third direction DR3. The circuit board CB may be attached on the subsidiary area SBA using an anisotropic conductive film (ACF). The circuit board CB may be electrically connected to a pad area formed on the subsidiary area SBA. The circuit board CB may be a flexible printed circuit board (FPCB), a printed circuit board (PCB), or a flexible film such as a chip-on-film (COF). The driver circuit DC may be implemented as an integrated circuit (IC) and may be attached to the subsidiary area SBA by a chip-on-glass (COG) technique, a chip-on-plastic (COP) technique, or ultrasonic bonding. In addition, the driver circuit DC may be mounted on the circuit board CB.

The panel support SP of the display module 100 may support the display panel PNL. The panel support SP may be attached to the bottom surface of the display panel PNL to support the display panel PNL.

An adhesive ADH may be interposed between the panel support SP and the display panel PNL. In an embodiment of the present invention, the adhesive ADH may be, but is not limited to, a pressure sensitive adhesive (PSA). The panel support SP may include a main plate MPL, a plurality of segments SG, and sub-plates SPL.

The main plate MPL, the plurality of segments SG and the sub-plates SPL may have substantially the same relative positional relationship with respect to the display panel PNL. For example, when the display panel PNL is flat without bending, at least one plane parallel to the display panel PNL may pass through the main plate MPL, the plurality of segments SG, a first sub-plate SPL, and a second sub-plate SPL.

The main plate MPL may support the first active area AA_1 of the display panel PNL. The main plate MPL may be disposed between the plurality of segments SG supporting the second active area AA_2 and the plurality of segments SG supporting the third active area AA_3. The main plate MPL and the first active area AA_1 of the display panel PNL may overlap each other in the third direction DR3.

The main plate MPL may have a plane shape (e.g., a polygonal shape such as a rectangle or square) extended in the first direction DR1 and the second direction DR2. In other words, the main plate MPL may have a generally flat shape when viewed from the top. For example, the main plate MPL may be disposed to have the same thickness in the third direction DR3 along the profile of the first active area AA_1 of the display panel PNL.

One surface of the main plate MPL in the third direction DR3 may be the upper surface where the first active area AA_1 of the display panel PNL is attached, while the opposite surface of the main plate MPL in the third direction DR3 may be the lower surface where an air gap is formed, which will be described later.

The plurality of segments SG may at least partially support the second active area AA_2, the third active area AA_3 and the dummy area DM of the display panel PNL. Each of the plurality of segments SG may be extended in the second direction DR2 and may be spaced apart from one another in the first direction DR1. The width of each of the plurality of segments SG in the third direction DR3 may be larger than the thickness of the main plate MPL. Accordingly, an air gap may be formed under the main plate MPL as shown in FIG. 5. As the air gap is formed under the main digitizer 110, a shock applied to the display panel PNL can be mitigated. For example, the air gap may absorb a shock when an object such as a user's pen drops onto the first active area AA_1 of the display panel PNL.

The sub-plates SPL may support the dummy area DM. The sub-plates SPL may have a plane shape (e.g., a rectangular shape) extended in the first direction DR1 and the second direction DR2, similarly to the main plate MPL. In other words, the sub-plates SPL may have a generally flat shape when viewed from the top.

The sub-plates SPL may include a plurality of through-holes H penetrating the sub-plates SPL in the third direction DR3. An elastic member 290 of the sliding module 200 to be described later may be connected to the sliding module 200 through the through holes H. In an embodiment of the present invention, the through holes H may have, but is not limited to, a circular shape when viewed from the top. Although five through holes H are formed in the example shown in FIG. 4, the number of through holes H is not limited thereto.

One of the sub-plates SPL that supports the first dummy area DM may be referred as a first sub-plate, while the other one of the sub-plates SPL that supports the second dummy area DM may be referred to as a second sub-plate.

The sliding module 200 may include a central part 230, upper expandable parts 210, lower expandable parts 220, rollers R, upper gear covers 240, roller connectors 250, panel connecting members 260, elastic members 290, lower gear covers 280, and lower connecting portions 270. The upper expandable parts 210, the lower expandable parts 220, the rollers R, the upper gear covers 240, the roller connectors 250, the panel connecting members 260, the elastic members 290, the lower gear covers 280 and the lower connecting portions 270 may be disposed on one side and the opposite side of the central part 230 in the first direction DR1, respectively.

The central part 230 of the sliding module 200 may fix one side of each of the upper expandable parts 210 and the lower expandable parts 220 to the sliding module 200, and may include a gear driver 300 to be described later to transmit power to the upper expandable parts 210 and the lower expandable parts 220. The central part 230 may include an upper central portion 231 and a lower central portion 233. For example, the upper central portion 231 may be at one side of the central part 230 in the third direction DR3, and the lower central portion 233 may be at the opposite side in the third direction DR3. For example, the upper central portion 231 may be disposed on the lower central portion 233.

The upper central portion 231 of the central part 230 may include a gear unit GR (see FIGS. 25 and 26) for driving the upper expandable part 210 to be described later. The lower central portion 233 of the central part 230 may include therein the gear unit GR for driving the lower expandable parts 220 (see FIGS. 25 and 27). The gear unit GR for driving the upper expandable parts 210 and the lower expandable parts 220 will be described in detail later.

The central part 230 may have such a shape that the width of the upper central portion 231 in the first direction DR1 is greater than the width of the lower central portion 233 in the first direction DR1. In addition, the lower central portion 233 protrudes from the center of the upper central portion 231 in the third direction DR1 toward a lower surface of the display module 100. In other words, the central part 230 may have a T-shape when viewed from the second direction DR2. This may be because the lower expandable parts 220 expand more than the upper expandable parts 210 in the first direction DR1, as will be described later.

The upper expandable part 210 of the sliding module 200 may move the rollers R in the first direction DR1. For example, the upper expandable parts 210 may be connected with the rollers R by the roller connectors 250 and may expand and contract in the first direction DR1 to move the rollers R in the first direction DR1. The upper expandable parts 210 may be disposed on both sides of the upper central portion 231 of the central part 230 in the first direction DR1, respectively. The opposite side of the upper expandable part 210 in the first direction DR1 may be connected to a part of the gear unit GR included in the upper gear cover 240 protruding in the first direction DR1 from the upper central portion 231, and the one side of the upper expandable part 210 in the first direction DR1 may be connected to the roller connector 250. The upper expandable parts 210 may include a plurality of upper links UL (see FIG. 8) and a plurality of lower links BLK (see FIG. 8), which will be described later. The configuration of the upper expandable parts 210 will be described in detail later.

As the upper expandable parts 210 expand and contract in the first direction DR1, it can move the rollers R in the first direction DR1, and accordingly, the display module 100 can move in the first direction DR1. As used herein, an expandable element refers to an element that can expand and contract.

The rollers R may assist the sliding behavior of the display module 100. In an embodiment of the present invention, the roller R may have a cylindrical shape extended in the second direction DR2, and may rotate in a clockwise or counterclockwise direction with respect to the rotation axis parallel to the second direction DR2. The rollers R may include a first roller R1 and a second roller R2. The first roller R1 may be disposed on one side of the display module 100 in the first direction DR1, and the second roller R2 may be disposed on the opposite side of the display module 100 in the first direction DR1. The first roller R1 may be involved in the sliding behavior of the portion of the display device 1 on the one side in the first direction DR1, and the second roller R2 may be involved in the sliding behavior of the portion of the display device 1 on the opposite side in the first direction DR1. The first roller R1 may be connected to the upper expandable part 210 disposed on one side of the central part 230 in the first direction DR1, and the second roller R2 may be connected to the upper expandable part 210 disposed on the opposite side of the central part 230 in the first direction DR1.

The rollers R may have the roller connectors 250 protruding in the first direction DR1, respectively. The roller connectors 250 may connect the rollers R with the upper expandable parts 210. The rotation of the rollers R might not be limited by the roller connectors 250. In an embodiment of the present invention, a guide rail GD or a panel connecting member 260, which will be described later, may be connected to the roller connectors 250, but the present invention is not limited thereto.

The lower expandable parts 220 of the sliding module 200 may fix the ends of the display module 100 so that it can slide stably. The lower expandable parts 220 may be disposed on the sides of the lower central portion 233 of the central part 230 in the first direction DR1. The length by which the lower expandable parts 220 expands in the first direction DR1 may be twice the length by which the upper expandable parts 210 expands in the first direction DR1.

The lower expandable parts 220 may include a first lower expandable part 221 and a second lower expandable part 223. The first lower expandable part 221 may be connected to the lower central portion 233 of the central part 230, and the second lower expandable part 223 may be connected to the first lower expandable part 221. In other words, the opposite side of the first lower expandable part 221 in the first direction DR1 may be connected to a part of the gear unit GR included in the lower gear cover 280 protruding in the first direction DR1 from the lower central portion 233, and the one side of the first lower expandable part 221 in the first direction DR1 may be connected to the one side of the second lower expandable part 223 in the first direction DR1. Each of the first lower expandable part 221 and the second lower expandable part 223 may include a plurality of upper links ULK and a plurality of lower links BLK, which will be described later. The configurations of the first lower expandable part 221 and the second lower expandable part 223 will be described later.

The first lower expandable part 221 and the second lower expandable part 223 may expand and contract. In an embodiment of the present invention, the length by which the first lower expandable part 221 expands and the length by which the second lower expandable part 223 expands may be substantially equal to the length by which the upper expandable part 210 expands. The present invention is not limited thereto. As used herein, the term "the expandable length of an element" may refer to the length by which the element expands or contracts. For example, the expandable length of the upper expandable part 210 may refer to the length by which it can expand or contract, the expandable length of the first lower expandable part 221 may refer to the length by which it can expand or contract, and the expandable length of the second lower expandable part 223 may refer to the length by which it can expand or contract.

In the following description, it is assumed that the expandable length of the first lower expandable part 221 and the expandable length of the second lower expandable part 223 may be substantially equal to the expandable length of the upper expandable part 210. In this instance, the expandable length of the lower expandable parts 220 may be the sum of the expandable length of the first lower expandable part 221 and the expandable length of the first upper expandable parts 210, and accordingly, the expandable length of the lower expandable parts 220 may be twice the expandable length of the upper expandable part 210.

The panel connecting member 260 connected to the end of the display module 100 may be connected to one side of the second lower expandable part 223 in the first direction DR1 by the lower connecting portion 270. A plurality of elastic members 290 having a predetermined elastic force may be disposed on the one side of the panel connecting member 260 in the first direction DR1. The elastic member 290 may be connected to the end of the display module 100 to provide a tension required for the display module 100. If the tension provided to the display module 100 is too weak, the display module 100 may be wrinkled as the display device 1 slides. If the tension provided to the display module 100 is too strong, the display module 100 may be broken.

Accordingly, it is desirable to constantly provide an appropriate level of tension. This will be described in more detail later.

The elastic members 290 may be connected to the through holes H formed in the sub-plate SPL as described above. In an embodiment of the present invention, the elastic members 290 may be, but is not limited to, springs.

The sliding module 200 may further include guide rails GD that guide the sliding behavior of the first lower expandable part 221 and the second lower expandable part 223 where the first lower expandable part 221 and the second lower expandable part 223 are connected. For example, the guide rails GD may be disposed on the opposite side of the lower expandable parts 220 in the third direction DR3. The panel connecting member 260 and the lower expandable part 220 may move in the first direction DR1 on the guide rails GD through grooves formed in the guide rails GD. This will be described in more detail later. Although the guide rails GD are disposed on the one side of the lower expandable parts 220 in the third direction DR3 in FIGS. 6 and 7, the present invention is not limited thereto.

As shown in FIGS. 1 and 2, the panel storage SD accommodates at least a part of the display module 100 and the sliding module 200, and may assist the sliding operation of the display device 1. The panel storage SD may include a first storage SD_1, a second storage SD_2, and a third storage SD_3. The first storage SD_1 may be located at the center of the display device 1. The second storage SD_2 may be disposed on the one side of the first storage SD_1 in the first direction DR1 and may comprise the first rounded area RA_1. The third storage SD_3 may be disposed on the opposite side of the first storage SD_1 in the first direction DR1 and may comprise the second rounded area RA_2.

The first storage SD_1 may connect the second storage SD_2 with the third storage SD_3. For example, the first storage SD_1 may include a (1_1) storage SD_Ia connecting the opposite side of the second storage SD_2 in the second direction DR2 with the opposite side of the third storage SD_3 in the second direction DR2; and a (1_2) storage SD_lb connecting the one side of the second storage SD_2 in the second direction DR2 with the one side of the third storage SD_3 in the second direction DR2.

In an embodiment of the present invention, rails may be formed inside the second storage SD_2 and the third storage SD_3 to guide the sliding operations of the display panel PNL. However, the present invention is not limited thereto.

Hereinafter, behaviors of the display module 100 and the sliding module 200 according to the sliding behavior of the display device 1 will be described.

Figure 7:
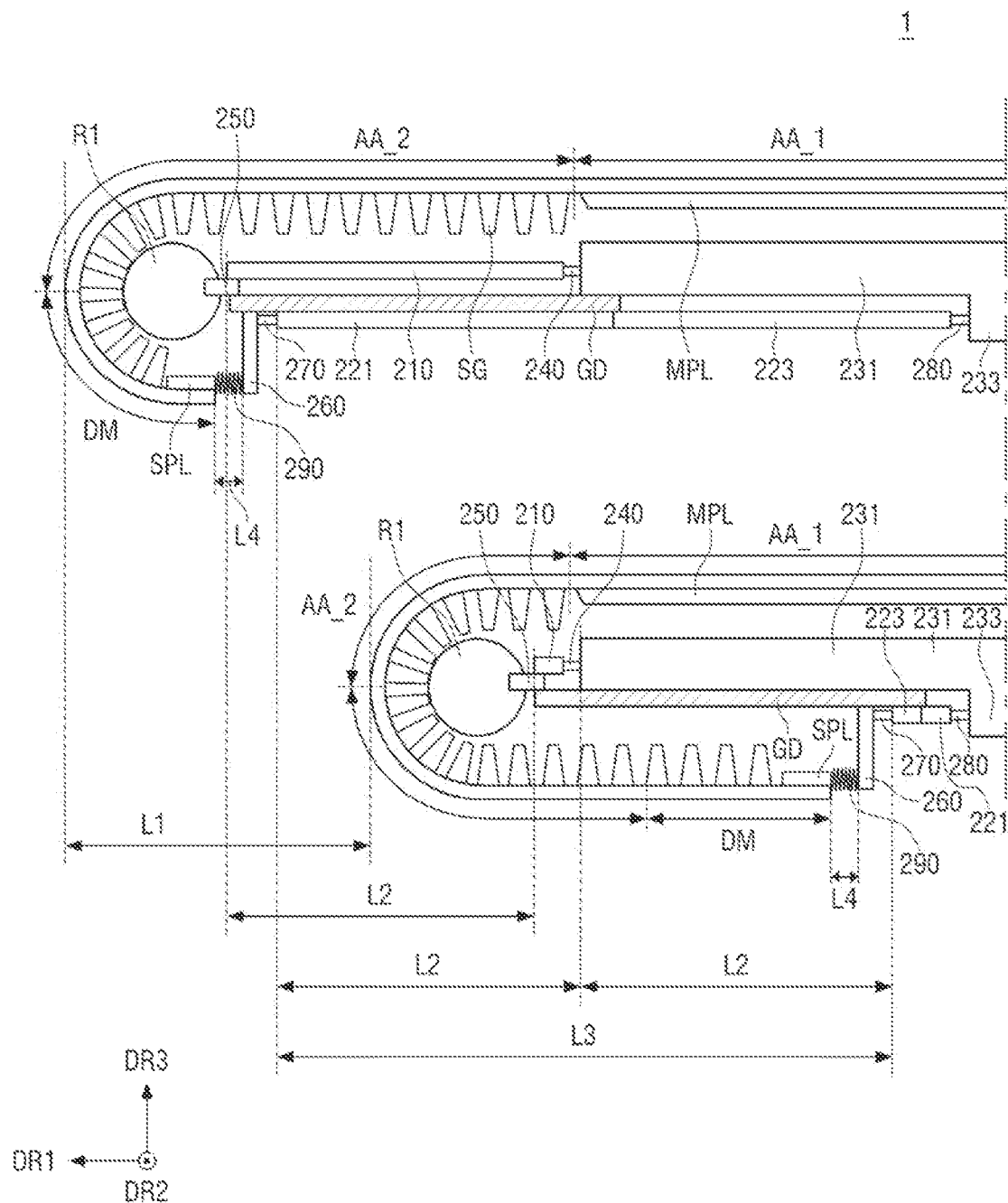
FIG. 7 is a view for illustrating sliding behaviors of a display module and a sliding module of a display device according to an embodiment of the present invention.

FIG. 7 is a view for illustrating sliding behaviors of a display module and a sliding module of a display device according to an embodiment of the present invention. For a multi-slidable display device, sliding behaviors of the display device in the first direction DR1 and the direction opposite to the fist direction DR1 are substantially the same. Accordingly, the sliding behavior of the display device in the first direction DR1 will be described, and the sliding behavior of the display device in the direction opposite to the first direction DR1 will not be described.

Referring to FIG. 7, when the display device 1 slides in the first direction DR1 toward the one side, the end of the display module 100 may move toward the one side in the first direction DR1 by the distance equal to twice the first width L1 by which the display device 1 slides in the direction DR1. The lower expandable parts 220 may expand by twice the expansion of the lower expandable part 220 in the first direction DR1 according to the behavior of the display module 100.

For example, when the display device 1 slides in the first direction DR1 toward the one side to expand by the first width L1, the display module 100 slides by the distance equal to the first width L1 plus the expansion of the display device 1 by the first width L1, and thus the end of the display module 100 may move in the first direction DR1 toward the one side by twice the first width L1.

According to the above-described behavior of the display module 100, the upper expandable parts 210 and the lower expandable parts 220 can expand at the same time. For example, when the display device 1 slides in the first direction DR1 toward the one side to expand, the upper expandable parts 210 expand in the first direction DR1 toward the one side, and the lower expandable parts 220 also expand in the first direction DR1 toward the one side. The upper expandable parts 210 expand by the distance equal to the second width L2 in the first direction DR1 that is equal to the first width L1 by which the display device 1 slides, and the lower expandable parts 220 connected to the end of the display module 100 expands by the distance equal to a third width L3 that is twice the first width L1. In this instance, the first lower expandable part 221 of the lower expandable parts 220 expands by the distance equal to the second width L2, and the second lower expandable part 223 also expands by the distance equal to the second width L2, so that the lower expandable parts 220 may expand by the distance equal to the third width L3 that is twice the second width L2. However, the present invention is not limited thereto. In an embodiment of the present invention, the first lower expandable part 221 may expand by a distance greater than the second width L2, and the second lower expandable part 223 may expand by a distance less than the second width L2, while the combined expansion distance of the first lower expandable part 221 and the second lower expandable part 223 may be equal to the third width LD3.

Likewise, when the display device 1 slides in the first direction DR1 toward the opposite side to contract by the first width L1, the display module 100 slides by the distance equal to the first width L1 plus the contraction of the display device 1 by the first width L1, and thus the end of the display module 100 may move toward the opposite side in the first direction DR1 by twice the first width L1.

According to the above-described behavior of the display module 100, the upper expandable parts 210 and the lower expandable parts 220 can expand at the same time. For example, when the display device 1 slides in the first direction DR1 toward the opposite side to contract, the upper expandable parts 210 contract in the first direction DR1 toward the opposite side, and the lower expandable parts 220 also contract in the first direction DR1 toward the opposite side. The upper expandable parts 210 contract by the distance equal to the second width L2 in the first direction DR1 that is equal to the first width L1 by which the display device 1 slides, and the lower expandable parts 220 connected to the end of the display module 100 contracts by the distance equal to the third width L3 that is twice the first width L1. In this instance, the first lower expandable part 221 of the lower expandable parts 220 contracts by the distance equal to the second width L2, and the second lower expandable part 223 also contracts by the distance equal to the second width L2, so that the lower expandable parts 220 may contract by the distance equal to the third width L3 that is twice the second width L2. However, the present invention is not limited thereto. In an embodiment of the present invention, the first lower expandable part 221 may contract by a distance greater than the second width L2, and the second lower expandable part 223 may contract by a distance less than the second width L2, while the combined contraction distance of the first lower expandable part 221 and the second lower expandable part 223 may be equal to the third width LD3.

By virtue of the above-described behavior, the constant distance equal to a fourth width L4 in the first direction DR1 can be kept between the end of the display module 100 and the lower expandable parts 220 (specifically, the panel connecting member 260). Accordingly, as a constant elastic force is applied to the elastic members 290, which connects the panel connecting members 260 with the ends of the display module 100, a constant tension is maintained in the display module 100 regardless of the sliding behavior of the display device 1, so that the surface quality of the display module 100 can be increased, and the display device 1 can slide stably. For example, the display module 100 might not bent or wrinkled, even partially, and may be maintained flat.

Hereinafter, the configuration of the upper expandable parts 210 will be described in detail.

Figure 8:
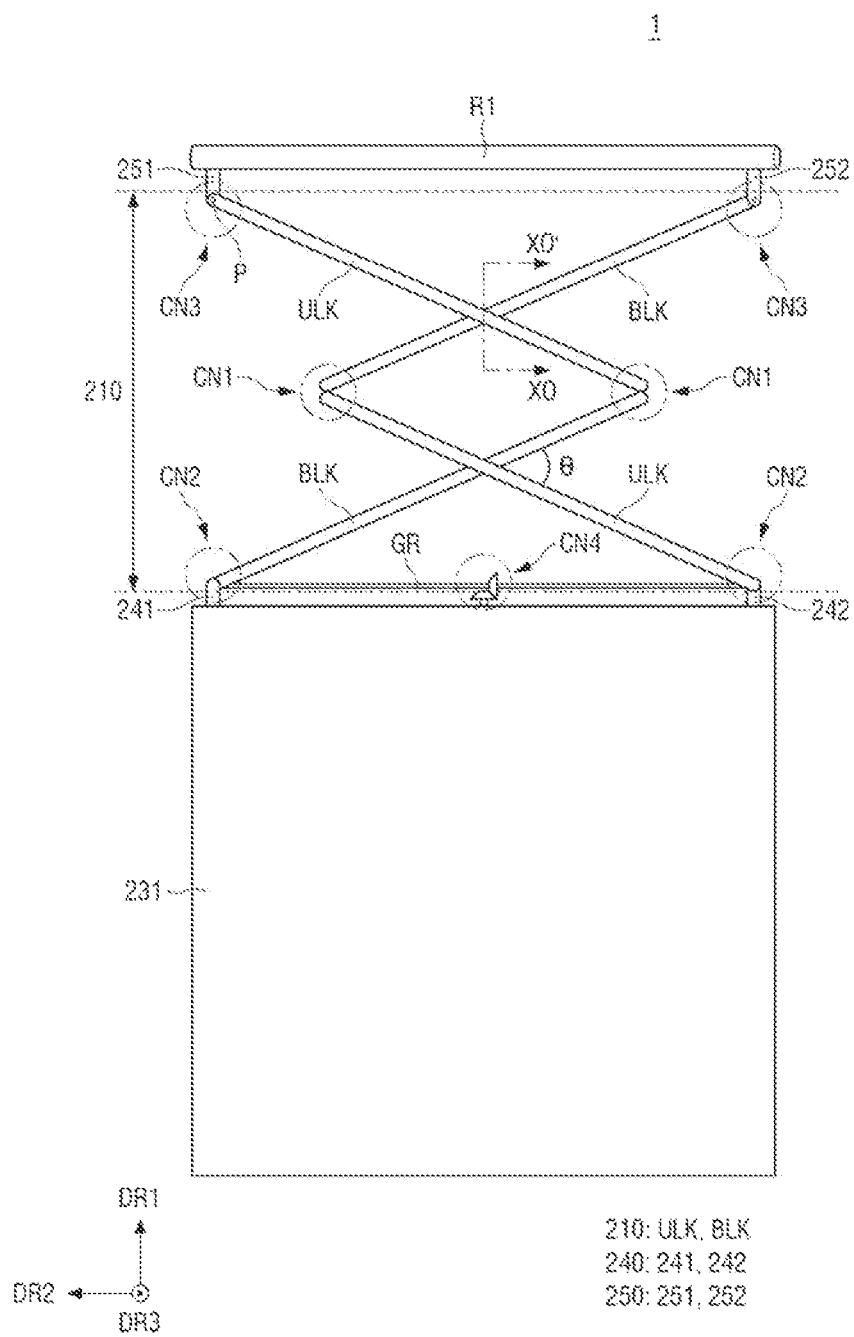
FIG. 8 is a view showing a structure of an upper expandable part of a display device according to an embodiment of the present invention.
Figure 9:
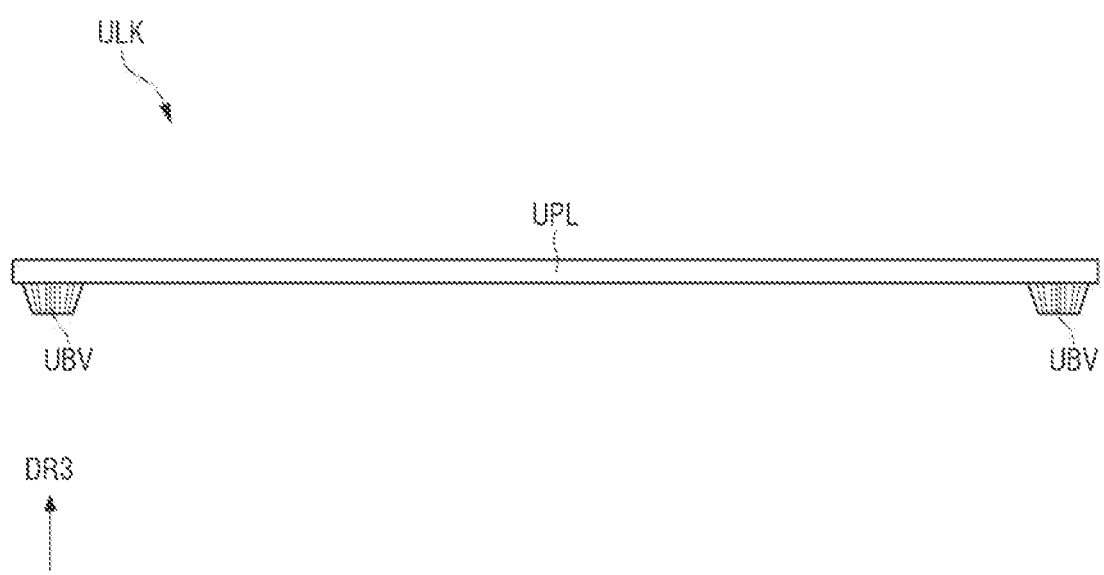
FIG. 9 is a plan view showing an upper link of a display device according to an embodiment of the present invention.
Figure 10:
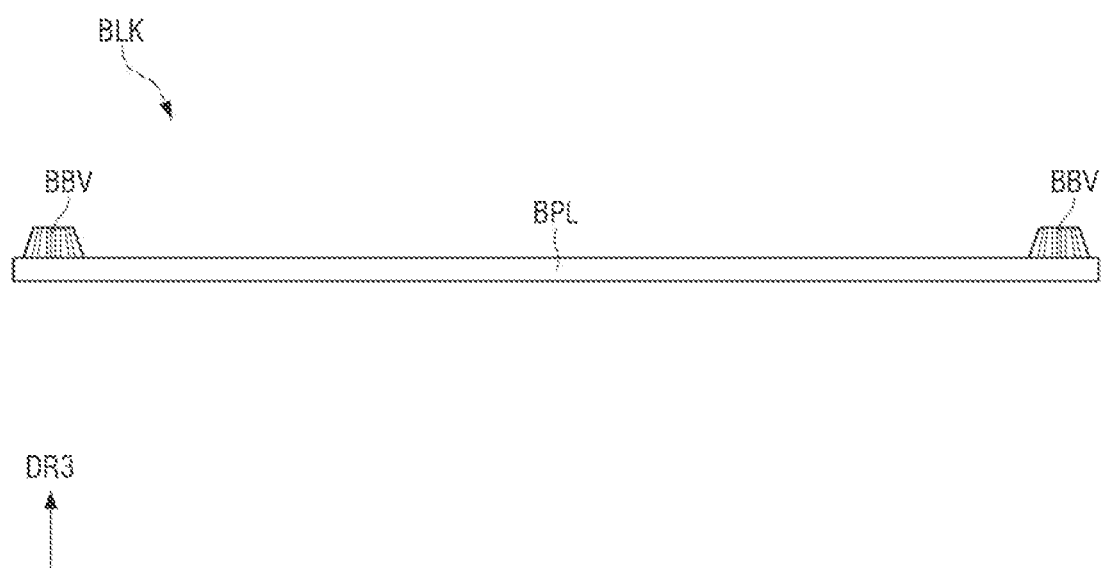
FIG. 10 is a plan view showing a lower link of a display device according to an embodiment of the present invention.
Figure 11:
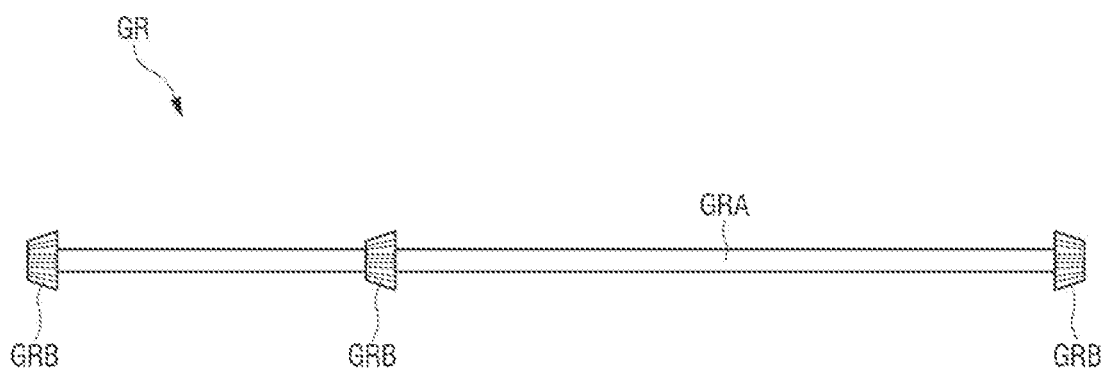
FIG. 11 is a view schematically showing a structure of a gear unit of a display device according to an embodiment of the present invention.

FIG. 8 is a view showing a structure of an upper expandable part of a display device according to an embodiment of the present invention. FIG. 9 is a plan view showing an upper link of a display device according to an embodiment of the present invention. FIG. 10 is a plan view showing a lower link of a display device according to an embodiment of the present invention. FIG. 11 is a view schematically showing a structure of a gear unit of a display device according to an embodiment of the present invention.

Referring to FIG. 8, the upper expandable part 210 of the display device 1 according to an embodiment of the present invention may include a plurality of lower links BLK and a plurality of upper links ULK. The plurality of lower links BLK may be extended in one direction and spaced apart from each other in the first direction DR1, and the plurality of upper links ULK may be extended in another direction intersecting the one direction and spaced apart from each other in the first direction DR1.

As used herein, the one direction refers to a direction in which the lower links BLK are extended. The one direction may vary depending on how long the display device 1 slides. Likewise, as used herein, the other direction refers to a direction in which the upper links ULK are extended. The other direction may vary depending on how long the display device 1 slides.

In addition, with respect to the first direction DR1 of FIG. 8, one side in the one direction refers to a direction toward the one side in the first direction DR1, and the opposite side in the one direction refers to a direction toward the opposite side in the first direction DR1. Similarly, with respect to the first direction DR1 of FIG. 8, one side in the other direction refers to a direction toward the one side in the first direction DR1, and the opposite side in the other direction refers to a direction toward the opposite side in the first direction DR1.

The plurality of lower links BLK and the plurality of upper links ULK may cross each other or may be connected with each other at corresponding ends. The opposite side of the upper expandable part 210 in the first direction DR1 may be connected to the gear unit GR included in the upper gear cover 240 connected to the upper central portion 231 as described above.

Prior to describing the arrangement relationship between the different elements, the structures of the lower links BLK, the upper links ULK and the gear unit GR will be briefly described with reference to FIGS. 9 to 11 for convenience of illustration.

Referring to FIG. 9, the upper link ULK may include an upper plate UPL extended in the other direction, and upper gears UBV disposed at one end and the opposite end of the upper plate UPL in the other direction and protruding from the bottom of the upper plate UPL in the third direction DR3 toward the opposite side. Each of the upper gears UBV may be, but is not limited to, a bevel gear having a width getting narrower in the third direction DR3 toward the opposite side. The upper gears UBV are bevel gears in the example shown in FIG. 9. As used herein, a bevel gear may refer to a conical gear capable of transmitting motion between two shafts crossing each other.

Referring to FIG. 10, the lower link ULK may include a lower plate BPL extended in the one direction, and lower gears BBV disposed at one end and the opposite end of the lower plate BPL in the one direction and protruding from the upper surface of the lower plate BPL in the third direction DR3 toward the one side. Each of the lower gears BBV may be, but is not limited to, a bevel gear having a width getting narrower toward the one side in the third direction DR3. The lower gears BBV are bevel gears in the example shown in FIG. 10. The shape of the lower gears BBV may be substantially identical to the shape of the upper gears UBV except that it is inverted.

Referring to FIG. 11, the gear unit GR may include a plurality of driving gears GRB and a gear shaft GRA penetrating through the plurality of driving gears GRB. The driving gears GRB may be bevel gears. In an example embodiment of the present invention, the shape of the driving gears GRB may be substantially identical to the shape of the lower gears BBV or the upper gears UBV except for the orientation. Although three driving gears GRB are disposed in the gear unit GR in the example shown in FIG. 11, the present invention is not limited thereto.

Referring back to FIG. 8, the roller connectors 250 may include a first roller connector 251 and a second roller connector 252. The first roller connector 251 may be disposed on one side in the second direction DR2, and the second roller connector 252 may be disposed on the opposite side in the second direction DR2. In addition, the upper gear cover 240 may include a first upper gear cover 241 and a second upper gear cover 242. The first upper gear cover 241 may be disposed on one side in the second direction DR2, and the second upper gear cover 242 may be disposed on the opposite side in the second direction DR2. The driving gears GRB of the gear unit GR may be included in the first upper gear cover 241 and the second upper gear cover 242.

The plurality of lower links BLK may include a lower link BLK, which is connected to the gear unit GR, and a lower link BLK, which is fixed to the second roller connector 252. The plurality of upper links ULK may include an upper link ULK, which is connected to the gear unit GR, and an upper link ULK, which is fixed to the first roller connector 251. Although the upper expandable part 210 includes two upper links ULK and two lower links BLK in the example shown in FIG. 8, the disclosure is not limited thereto.

For convenience of illustration, using the relative positional relationship between the plurality of lower links BLK and the plurality of upper links ULK included in the upper expandable part 210, the lower link BLK on the opposite side in the first direction DR1 is referred to as a first lower link, the upper link ULK on the opposite side in the first direction DR1 is referred to as a first upper link, the lower link BLK on the one side in the first direction DR1 is referred to as a second lower link, and the upper link ULK on the one side in the first direction DR1 is referred to as a second upper link.

Figure 19:
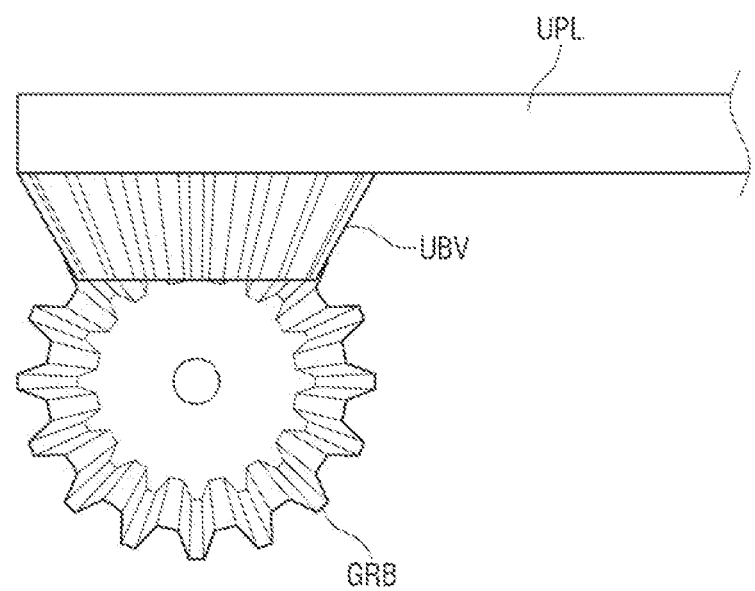
FIG. 19 is a view for illustrating the third connection type of FIG. 8, and specifically, a view showing a bevel gear of a gear unit and an upper gear of an upper link of a display device according to an embodiment of the present invention engaged with each other.
Figure 19:
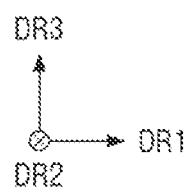

The upper gear UBV disposed at the opposite end of the first upper link in the other direction may be connected to the driving gear GRB of the gear unit GR included in the second upper gear cover 242 in a second connection type (see FIG. 19). Likewise, the lower gear BBV disposed at the opposite end of the first lower link in the one direction may be connected to the driving gear GRB of the gear unit GR included in the first upper gear cover 241 in the second connection type. The second connection type CN2 will be described later. The upper gear cover 240 may guide the first upper link and the second upper link so that they do not deviate.

The first lower link and the first upper link may cross each other. For example, the lower plate BPL of the first lower link and the upper plate UPL of the first upper link may be spaced apart from each other with a predetermined distance in the third direction DR3 therebetween and may cross each other (see FIG. 15). A detailed description thereon will be made later. In this instance, when viewed from the third direction DR3, the first upper link and the first lower link may cross each other at a predetermined angle θ.

Figure 16:
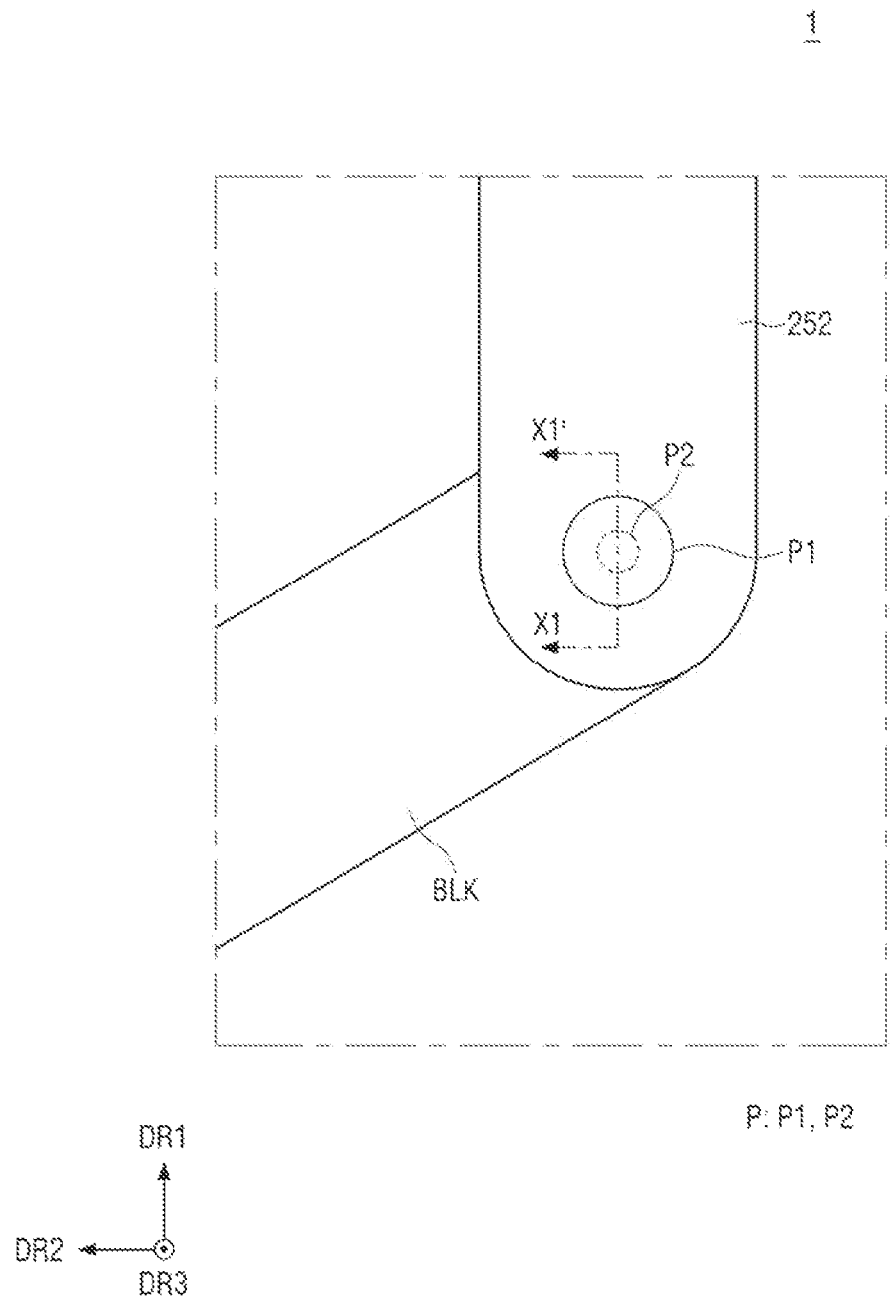
FIGS. 16, 17 and 18 are views for illustrating the second connection type of FIG. 8, specifically, views showing the pin connection between a lower gear of a lower link and a second roller connector in a display device according to an embodiment of the present invention.
Figure 17:
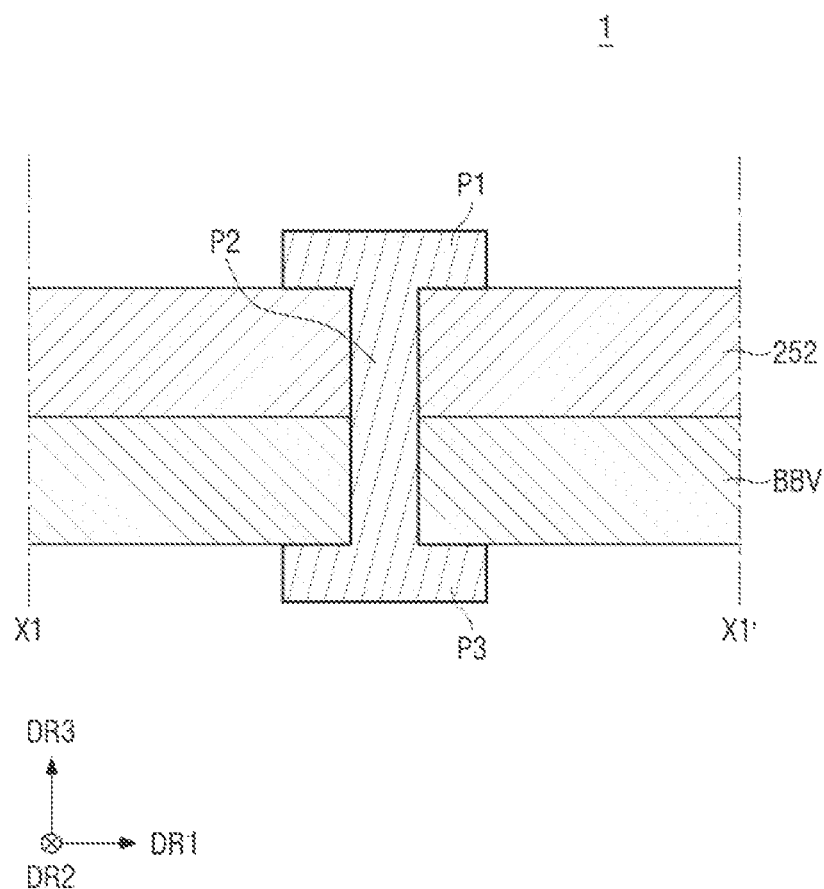
Figure 18:
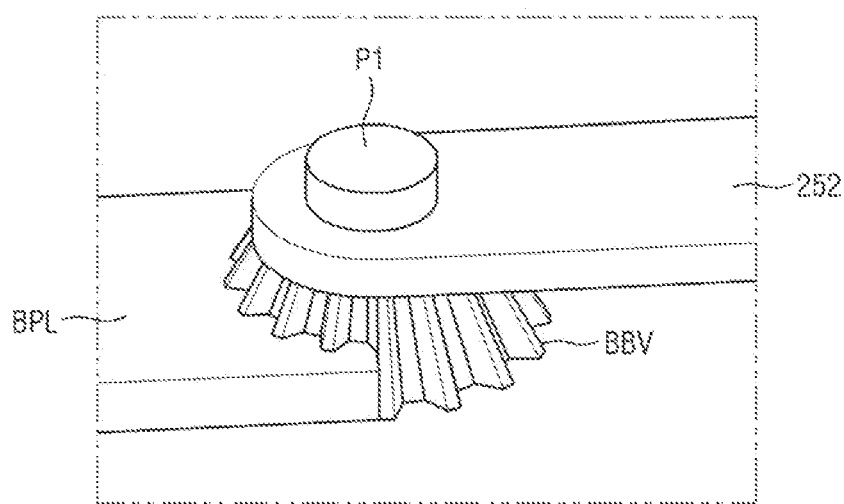

The upper gear UBV disposed at the opposite end of the second upper link in the other direction may be fixed to the first roller connector 251 in a third connection type CN3 (see FIGS. 16 to 18). Similarly, the lower gear BBV disposed at the one end of the second lower link in the one direction may be fixed to the second roller connector 252 in the third connection type CN3.

The second lower link and the second upper link may cross each other similarly to the first lower link and the first upper link crossing each other. For example, the lower plate BPL of the second lower link and the upper plate UPL of the second upper link may be spaced apart from each other with a predetermined distance in the third direction DR3 therebetween and may cross each other (see FIG. 15). In this instance, when viewed from the third direction DR3, the second upper link and the second lower link may cross each other at a predetermined angle θ. The first upper link and the second upper link are parallel to each other in the other direction, and the first lower link and the second lower link are parallel to each other in the one direction. Therefore, the angle of intersection formed by the first lower link and the first upper link may be equal to the angle of intersection formed by the second lower link and the second upper link.

The lower gear BBV disposed at the one end of the first lower link in the one direction may be connected to the upper gear UBV disposed at the one end of the second upper link in the other direction in the first connection type CN1. Similarly, the upper gear UBV disposed at the one end of the first upper link in the other direction may be connected to the lower gear BBV disposed at the opposite end of the second lower link in the one direction in the first connection type CN1. More detailed description thereon will be made with reference to FIGS. 12 to 14.

Figure 12:
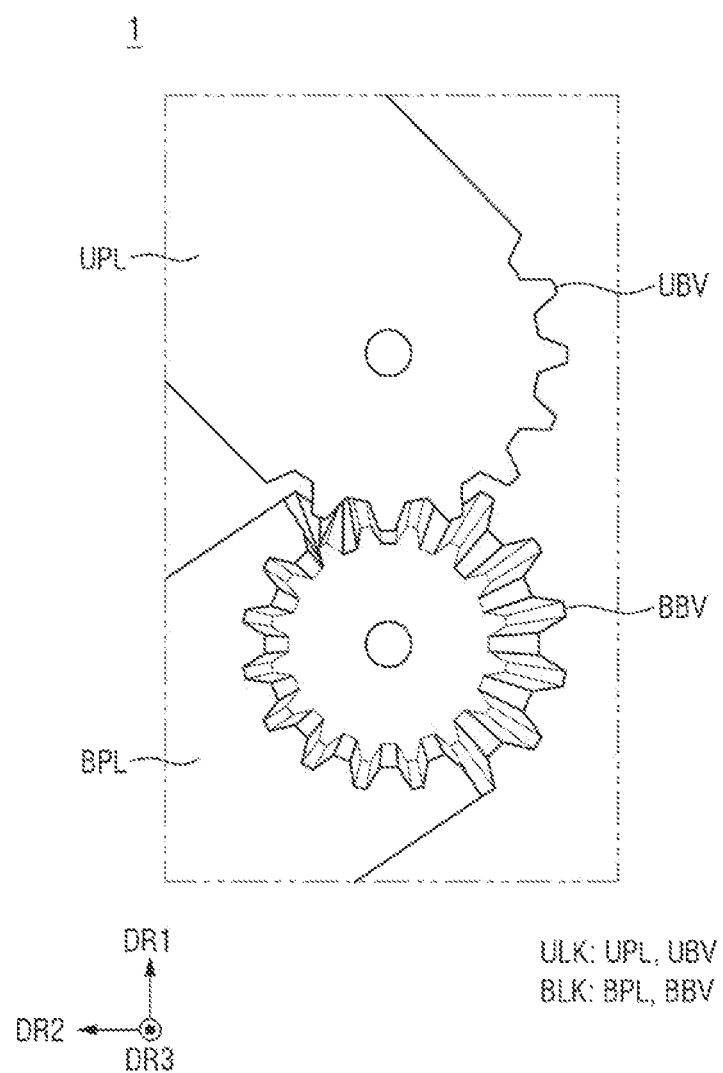
FIGS. 12 and 13 are views for illustrating the first connection type of FIG. 8, and specifically, views showing a lower gear of a lower link and an upper gear of an upper link engaged with each other according to an embodiment of the present invention.
Figure 13:
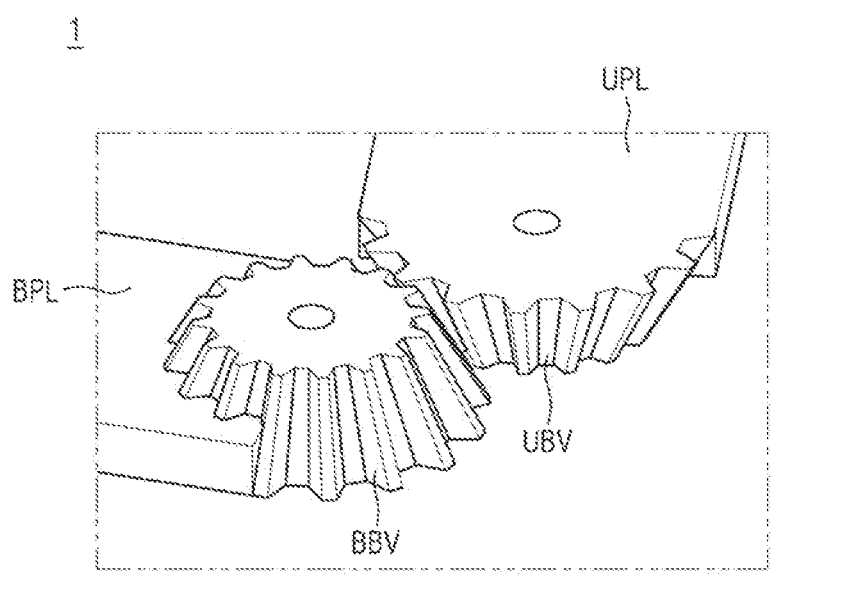
Figure 13:
Figure 14:
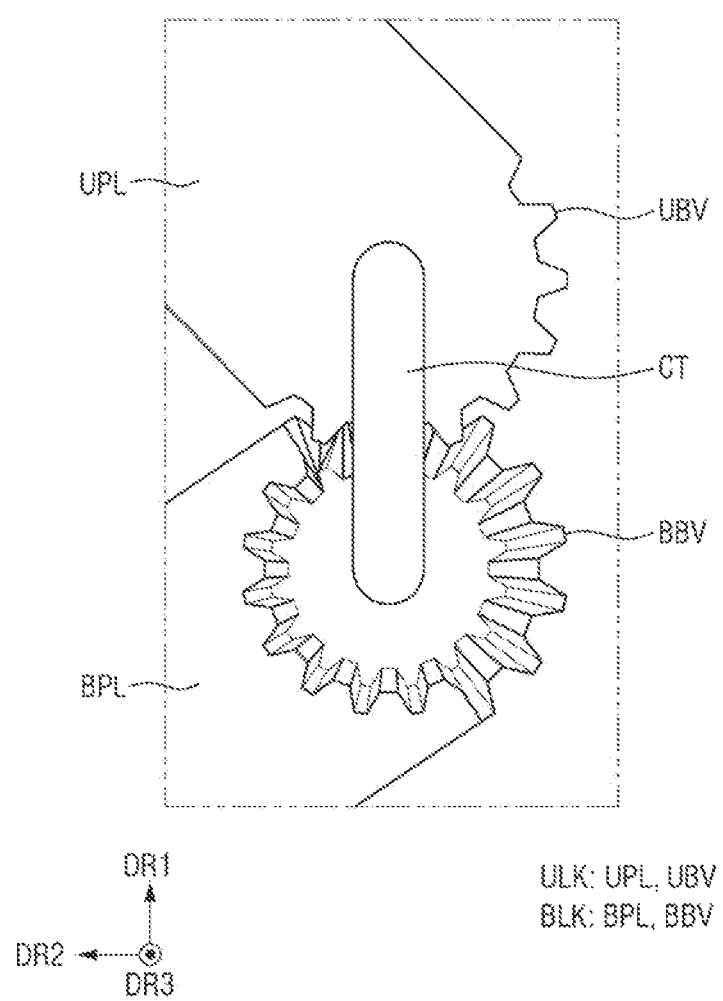
FIG. 14 is a view showing a fixing member disposed where the lower gear and the upper gear are engaged with each other.
Figure 15:
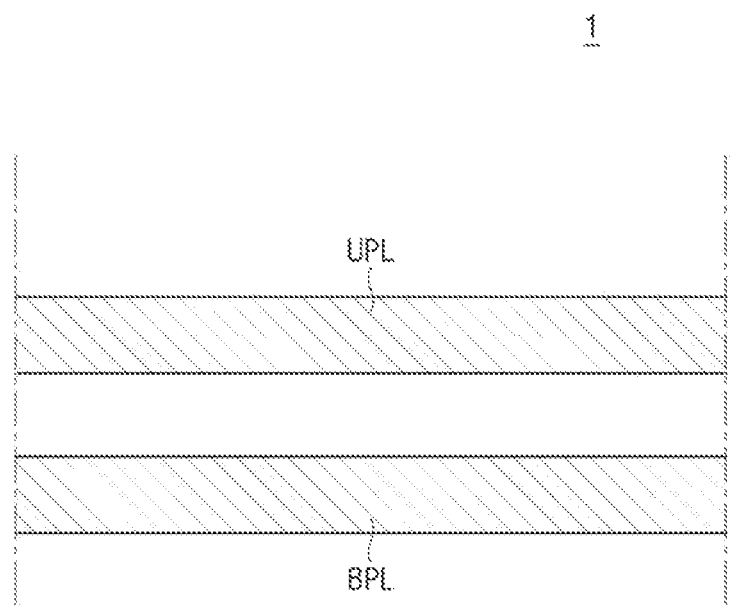
FIG. 15 is a cross-sectional view, taken along line X0-X0' of FIG. 8.
Figure 15:
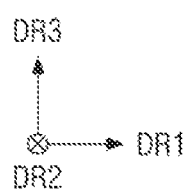

FIGS. 12 and 13 are views for illustrating the first connection type of FIG. 8, and specifically, views showing a lower gear of a lower link and an upper gear of an upper link engaged with each other according to an embodiment of the present invention. FIG. 14 is a view showing a fixing member disposed where the lower gear and the upper gear are engaged with each other. FIG. 15 is a cross-sectional view, taken along line X0-X0' of FIG. 8.

Referring to FIGS. 12 and 13, the first connection type CN1 may refer to the connection relationship between the upper gear UBV and the lower gear BBV, and specifically, the connection relationship in which the bevel gears are engaged with each other in parallel. As described above, the upper gear UBV protrudes from the lower surface of the upper plate UPL in the third direction DR3 toward the opposite side DR3, and the lower gear BBV protrudes from the upper surface of the lower plate BPL in the third direction DR3 toward the one side, so that they can be easily engaged with each other. In this instance, it is desirable to prevent the upper gear UBV and the lower gear BBV from being deviated from each other because they have to be engaged with each other. To this end, the display device 1 according to an embodiment of the present invention may further include a fixing member CT that connects the upper gear UBV with the lower gear BBV.

When the upper gear UBV and the lower gear BBV are engaged with each other by the first connection type CN1, the teeth of the upper gear UBV are engaged with the teeth of the lower gear BBV and they rotate by the driving of the gear driver, so that the upper link ULK and the lower link BLK can rotate, which will be described later (see FIG. 29). For example, when the lower link BLK rotates counter-clockwise when viewed from the one side in the third direction DR3, the upper link ULK may rotate clockwise when viewed from the one side in the third direction DR3. In other words, since the axis of rotation of the upper link ULK and the axis of rotation of the lower link BLK are parallel to each other, the upper gear UBV and the lower gear BBV, which are connected in the first connection type CN1, may move in the opposite rotation directions on the same plane.

In addition, the upper gear UBV protrudes from the lower surface of the upper plate UPL in the third direction DR3 toward the opposite side, and the lower gear BBV protrudes from the upper surface of the lower plate BPL in the third direction DR3 toward the one side, so that the upper plate UPL and the lower plate BPL may be spaced apart from each other by a predetermined distance in the third direction DR3. Accordingly, the first upper link and the first lower link, and the second upper link and the second lower link may cross each other such that the upper plate UPL and the lower plate BPL are spaced apart from each other by a predetermined distance in the third direction DR3, as shown in FIG. 15.

Next, the third connection type CN3 will be described in conjunction with FIGS. 16 to 18.

FIGS. 16 to 18 are views for illustrating the third connection type of FIG. 8, specifically, views showing the pin connection between a lower gear of a lower link and a second roller connector in a display device according to an embodiment of the present invention. FIG. 17 is a cross-sectional view showing a cross section taken along line X1-X1' of FIG. 16.

Referring to FIGS. 16 to 18, the third connection type CN3 may refer to a connection relationship in which a pin P is inserted into the upper gear UBV or the lower gear BBV to be fixed with the roller connector 250. FIGS. 16 to 18 shows an example where the second roller connector 252 and the lower gear BBV are connected with each other in the third connection type CN3.

The pin P may include a first external portion P1, a second external portion P3, and an internal portion P2 having a smaller diameter than each of the first external portion P1 and the second external portion P3. The diameter of the first external portion P1 may be substantially the same as that of the second external portion P3; however, the present invention is not limited thereto. The first external portion P1 may be disposed on the upper surface of the second roller connector 252. The second external portion P3 may be disposed on the lower surface of the lower gear BBV, and the internal portion P2 may penetrate the second roller connector 252 and the lower gear BBV. In this manner, the lower gear BBV and the second roller connector 252 can be fixed to each other.

Next, the second connection type CN2 will be described in conjunction with FIG. 19.

FIG. 19 is a view for illustrating the second connection type of FIG. 8, and specifically, a view showing a bevel gear of a gear unit and an upper gear of an upper link, of a display device according to an embodiment of the present invention, engaged with each other.

Referring to FIG. 19, the second connection type CN2 may refer to a connection relationship in which the driving gear GRB is engaged with the upper gear UBV or the lower gear BBV. For example, the second connection type CN2 may refer to a form in which the bevel gears are vertically engaged with each other. As described above, the structure of the driving gear GRB is substantially identical to the structure of the upper gear UBV and the lower gear BBV except for the orientation, so that the driving gear GRB can be engaged with the upper gear UBV or the lower gear BBV. FIG. 19 shows an example where the upper gear UBV and the driving gear GRB are connected with each other in the second connection type CN2.

As will be described later, when the driving gear GRB receives power from the gear driver 300 to rotate, the power is transmitted to the upper gear UBV so that the upper link ULK can rotate (see FIG. 28). As described above, since the bevel gears are vertically engaged with each other in the second connection type CN2, the rotation axis of the driving gear GRB and the rotation axis of the upper link ULK may be perpendicular to each other. This will be described in more detail later.

In addition, a fourth connection type CN4 in which the driving gears GRB are connected with each other is substantially identical to the above-described second connection type CN2, and therefore, the redundant descriptions may be omitted.

Hereinafter, the structure of the lower expandable part 220 and the arrangement relationship of a variety of elements disposed adjacent thereto will be described.

Figure 20:
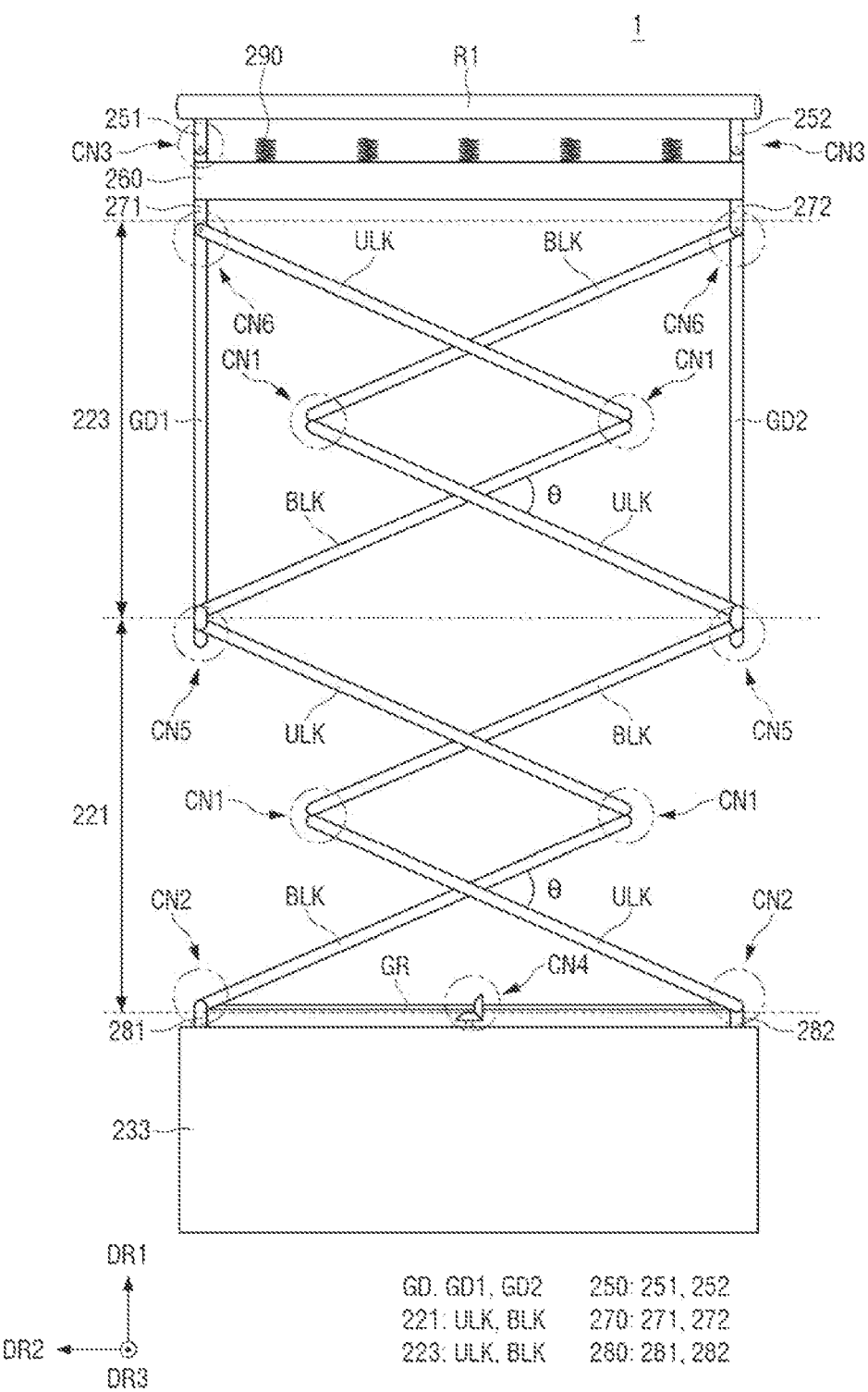
FIG. 20 is a view showing a structure of a lower expandable part of a display device according to an embodiment of the present invention.
Figure 21:
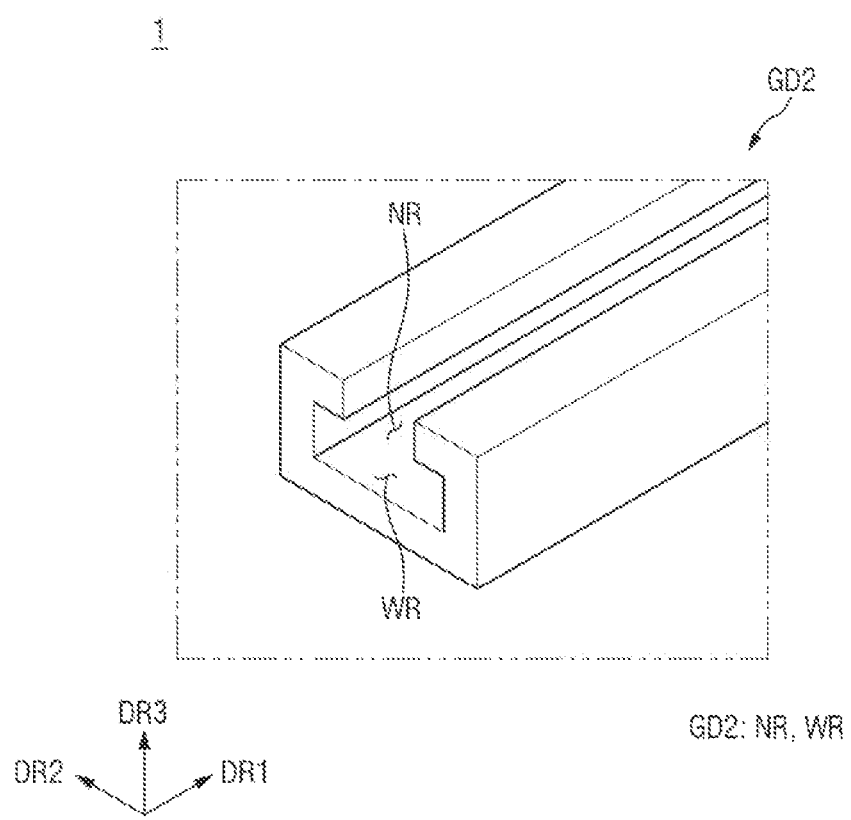
FIG. 21 is a perspective view showing an internal structure of the guide rail of FIG. 20.

FIG. 20 is a view showing a structure of a lower expandable part of a display device according to an embodiment of the present invention. FIG. 21 is a perspective view showing an internal structure of the guide rail of FIG. 20.

Referring to FIG. 20, the lower expandable part 220 may also include a plurality of lower links BLK and a plurality of upper links ULK. For example, the number of the plurality of lower links BLK included in the lower expandable part 220 may be twice the number of the plurality of lower links BLK included in the upper expandable part 210. The number of the plurality of upper links ULK included in the lower expandable part 220 may be twice the number of the plurality of upper links ULK included in the upper expandable part 210.

In other words, the number of the plurality of lower links BLK and the number of upper links ULK included in the first lower expandable part 221 may be equal to the number of the plurality of lower links BLK and the number of the upper links ULK included in the upper expandable part 210. The number of the plurality of lower links BLK and the number of upper links ULK included in the second lower expandable part 223 may be equal to the number of the plurality of lower links BLK and the number of upper links ULK included in the upper expandable part 210. Although the number of the plurality of lower links BLK is four and the number of the plurality of upper links ULK is four in the lower expandable part 220 in the example shown in FIG. 20, the present invention is not limited thereto.

In addition, the lower gear cover 280 may include a first lower gear cover 281 and a second lower gear cover 282. The first lower gear cover 281 may be disposed on the one side of the lower central portion 233, and the second lower gear cover 282 may be disposed on the opposite side, in the second direction DR2, of the lower central portion 233. The lower connecting portion 270 may include a first lower connecting portion 271 and a second lower connecting portion 272. The first lower connecting portion 271 may be disposed on one side of the panel connecting member 260, and the second lower connecting portion 272 may be disposed on the opposite side, in the second direction DR2, of the panel connecting member 260.

Referring to FIGS. 20 and 21, the guide rails GD may be fixed to the roller connectors 250 and extended in the first direction DR1. The guide rails GD may guide the behavior of the lower expandable parts 220 so that they do not deviate in the second direction DR2. A detailed description thereon will be made later. The guide rails GD may include a first guide rail GD1 and a second guide rail GD2. The first guide rail GD1 may be fixed to the first roller connector 251 in the third connection type CN3, and the second guide rail GD2 may be fixed to the second roller connector 252 in the third connecting form CN3. Although the guide rails GD are disposed on the lower surface of the lower expandable parts 220 in the example shown in FIG. 20, the arrangement of the guide rails GD is not limited thereto.

As shown in FIG. 21, a first groove NR and a second groove WR may be formed in the guide rail GD. The first groove NR may have a width in the second direction DR2 and may be extended in the first direction DR1, and the second groove WR may have a width larger than the width of the first groove NR in the second direction DR2 and may be extended in the first direction DR1. As will be described later, if an element is connected by a fifth connection type CN5 or a sixth connection type CN6, the element may be engaged with the first groove NR and the second groove WR to move on the guide rail GD. This will be described in more detail later.

The relative positional relationship used for describing the plurality of upper links ULK and the plurality of lower links BLK of the upper expandable parts 210 may be equally applied to the relative positional relationship between a plurality of upper links ULK and a plurality of lower links BLK of the first and second lower expandable parts 221 and 223.

That is to say, for convenience of illustration, using their relative positional relationship between the plurality of lower links BLK and the plurality of upper links ULK included in the first lower expandable part 221, the lower link BLK on the opposite side in the first direction DR1 is referred to as a first lower link, the upper link ULK on the opposite side in the first direction DR1 is referred to as a first upper link, the lower link BLK on the one side in the first direction DR1 is referred to as a second lower link, and the upper link ULK on the one side in the first direction DR1 is referred to as a second upper link.

In addition, for convenience of illustration, using their relative positional relationship between the plurality of lower links BLK and the plurality of upper links ULK included in the second lower expandable part 223, the lower link BLK on the opposite side in the first direction DR1 is referred to as a first lower link, the upper link ULK on the opposite side in the first direction DR1 is referred to as a first upper link, the lower link BLK on the one side in the first direction DR1 is referred to as a second lower link, and the upper link ULK on the one side in the first direction DR1 is referred to as a second upper link.

For the first lower expandable part 221, the upper gear UBV disposed at the opposite end of the first upper link in the other direction may be connected to the driving gear GRB of the gear unit GR included in the second lower gear cover 282 in the second connection type (see FIG. 19). Likewise, the lower gear BBV disposed at the opposite end of the first lower link in the one direction may be connected to the driving gear GRB of the gear unit GR included in the first lower gear cover 281 in the second connection type. The lower gear cover 280 may guide the first upper link and the second upper link so that they do not deviate.

For the first lower expandable part 221, the first lower link and the first upper link may cross each other. For example, the lower plate BPL of the first lower link and the upper plate UPL of the first upper link may be spaced apart from each other with a predetermined distance in the third direction DR3 therebetween (see FIG. 15). In this instance, when viewed from the third direction DR3, the first upper link and the first lower link may cross each other at a predetermined angle θ.

For the first lower expandable part 221, the lower gear BBV disposed at the one end of the first lower link in the one direction may be connected to the upper gear UBV disposed at the opposite end of the second upper link in the other direction in the first connection type CN1. Similarly, the upper gear UBV disposed at the one end of the first upper link in the other direction may be connected to the lower gear BBV disposed at the opposite end of the second upper link in the one direction in the first connection type CN1.

For the first lower expandable part 221, the second lower link and the second upper link may cross each other similarly to the first lower link and the first upper link crossing each other. For example, the lower plate BPL of the second lower link and the upper plate UPL of the second upper link may be spaced apart from each other with a predetermined distance in the third direction DR3 therebetween and may cross each other (see FIG. 15). In this instance, when viewed from the third direction DR3, the second upper link and the second lower link may cross each other at a predetermined angle θ. The first upper link and the second upper link are parallel to each other in the other direction, and the first lower link and the second lower link are parallel to each other in the one direction. Therefore, the angle of intersection formed by the first lower link and the first upper link may be equal to the angle of intersection formed by the second lower link and the second upper link.

For the second lower expandable part 223, the upper gear UBV disposed at the one end of the second upper link in the other direction may be fixed to the first lower connecting portion 271 in the sixth connection type CN6 (see FIGS. 16 to 18). Similarly, the lower gear BBV disposed at the one end of the second lower link in the one direction may be fixed to the second lower connecting portion 272 in the sixth connection type CN6. The sixth connection type CN6 will be described in detail later.

For the second lower expandable part 223, the first lower link and the first upper link may cross each other. Specifically, the lower plate BPL of the first lower link and the upper plate UPL of the first upper link may be spaced apart from each other with a predetermined distance in the third direction DR3 therebetween (see FIG. 15). In this instance, when viewed from the third direction DR3, the first upper link and the first lower link may cross each other at a predetermined angle θ.

For the second lower expandable part 223, the second lower link and the second upper link may cross each other similarly to the first lower link and the first upper link crossing each other. For example, the lower plate BPL of the second lower link and the upper plate UPL of the second upper link may be spaced apart from each other with a predetermined distance in the third direction DR3 therebetween and may cross each other (see FIG. 15). In this instance, when viewed from the third direction DR3, the second upper link and the second lower link may cross each other at a predetermined angle θ. The first upper link and the second upper link are parallel to each other in the other direction, and the first lower link and the second lower link are parallel to each other in the one direction. Therefore, the angle of intersection formed by the first lower link and the first upper link may be equal to the angle of intersection formed by the second lower link and the second upper link.

As described above, the angle of intersection formed by the lower links BLK and the upper links ULK of the upper expandable part 210, the first lower expandable part 221, and the second lower expandable part 223 are all equal, i.e., the predetermined angle θ. Therefore, when the display module 100 is expanded by rotating the lower links BLK and the upper links ULK by the gear driver unit 300 to be described later, the expandable lengths of the upper expandable part 210, the first lower expandable part 221 and the second lower expandable part 223 may be all equal.

For example, for convenience of illustration, the angle of intersection formed by the lower link BLK and the upper link ULK of the upper expandable part 210 is referred to as a first angle, the angle of intersection formed by the lower link BLK and the upper link ULK of the first lower expandable part 221 is referred to as a second angle, and the angle of intersection formed by the lower link BLK and the upper link ULK of the second lower expandable part 223 is referred to as a third angle. As the first angle changes, the expandable length of the upper expandable part 210 changes. As the second angle changes, the expandable length of the first lower expandable part 221 changes. As the third angle changes, the expandable length of the second lower expandable part 223 changes. In other words, when the display device 1 slides, as will be described later, the lower link BLK and upper link ULK rotate, and accordingly the first angle, the second angle and the third angle change. As a result, the upper expandable parts 210 may expand or contract, the first lower expandable part 221 may expand or contract, and the second lower expandable part 223 may expand or contract. For example, when the first angle increases, the upper expandable part 210 may expand, and when the first angle decreases, the upper expandable part 210 may contract. For example, when the second angle increases, the first lower expandable part 221 may expand, and when the second angle decreases, the first lower expandable part 221 may contract. For example, when the third angle increases, the second lower expandable part 223 may expand, and when the third angle decreases, the second lower expandable part 223 may contract.

In this instance, the amount of change in the expandable length of the upper expandable part 210 may be affected by the first angle and the change amount of the first angle. In addition, the amount of change in the expandable length of the first lower expandable part 221 may be affected by the second angle and the change amount of the second angle.

The expandable length of the second lower expandable part 223 may be affected by the third angle and the amount of change of the third angle.

If one of the first angle, the second angle and the third angle is changed, the amount of change in the expandable length of the upper expandable parts 210, the amount of change in the expandable length of the first lower expandable part 221, and the amount of change in the expandable length of the second lower expandable part 223 are changed, such that the amount of change in the expandable length of the lower expandable parts 220 is not equal to twice the amount of change in the expandable length of the upper expandable parts 210. As a result, it is not possible to maintain the surface quality. In view of the above, when the first angle, the second angle and the third angle are all equal to each other, the amount of change in the expandable length of the upper expandable parts 210, the amount of change in the expandable length of the first lower expandable part 221, and the amount of change in the expandable length of the second lower expandable part 223 are all equal to each other. In doing so, the amount of change in the expandable length of the lower expandable parts 220 is equal to twice the amount of change in the expandable length of the upper expandable parts 210. As a result, it is possible to maintain the surface quality.

Incidentally, the one side of the first lower expandable part 221 in the first direction DR1 and the opposite side of the second lower expandable part 223 in the first direction DR1 may be connected to each other. For example, the upper gear UBV disposed at the one end of the second upper link of the first lower expandable part 221 in the other direction may be engaged with the lower gear BBV disposed at the opposite end of the first lower link of the second lower expandable part 223 in the one direction in the fifth connection type CN5. The lower gear BBV disposed at the one end of the second lower link of the first lower expandable part 221 in the one direction may be engaged with the upper gear UBV disposed at the opposite end of the first upper link of the second lower expandable part 223 in the other direction in the fifth connection type CN5. Hereinafter, the fifth connection type CN5 will be described in conjunction with FIGS. 22 to 24.

Figure 22:
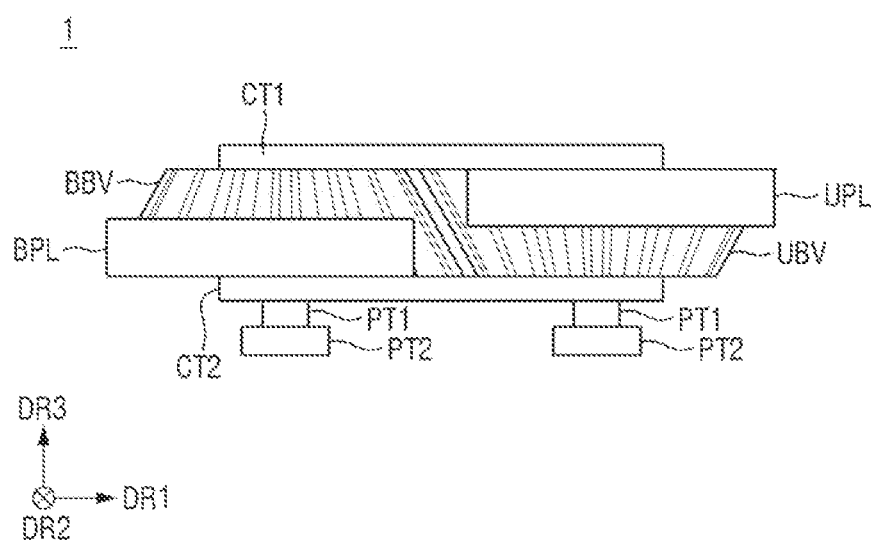
FIGS. 22, 23 and 24 are views for illustrating the fifth connection type of FIG. 20, and specifically, views showing a fixing member for fixing a lower gear of a lower link to an upper gear of an upper link engaged with a guide rail.
Figure 23:
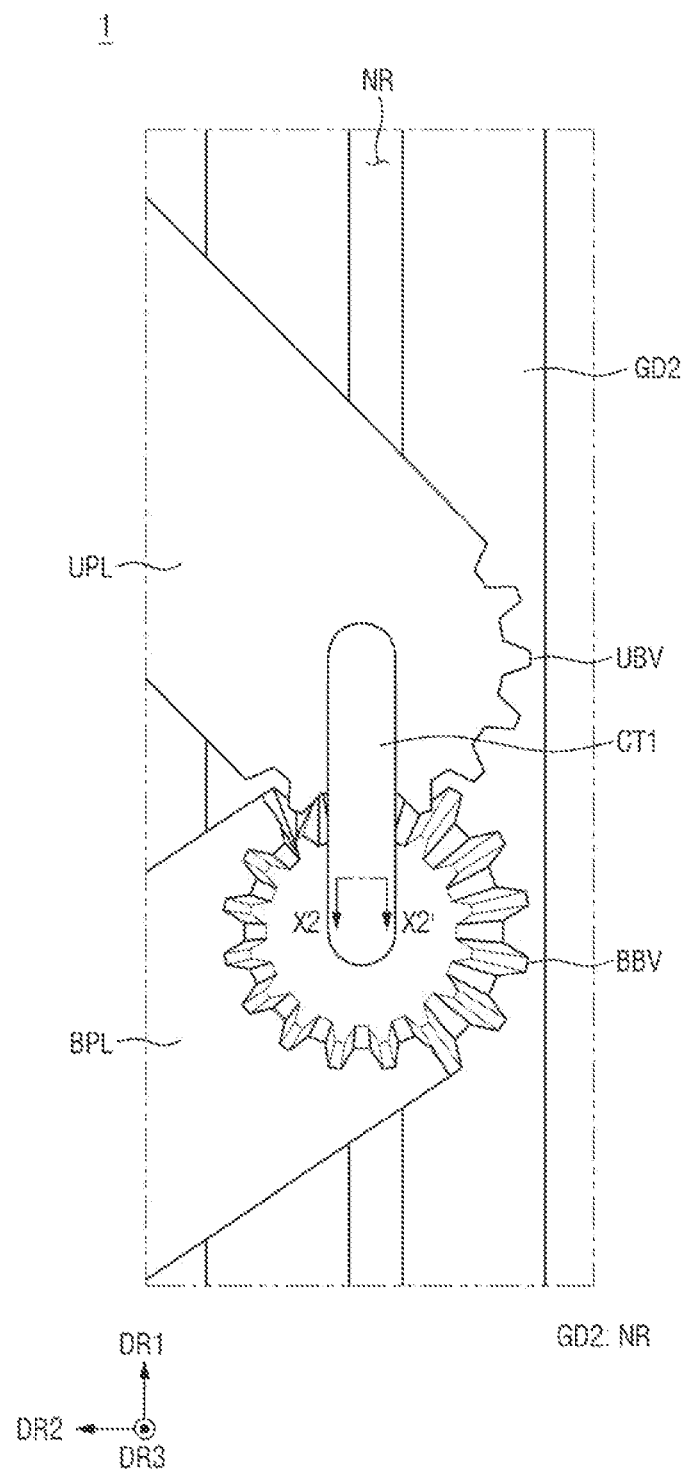
Figure 24:
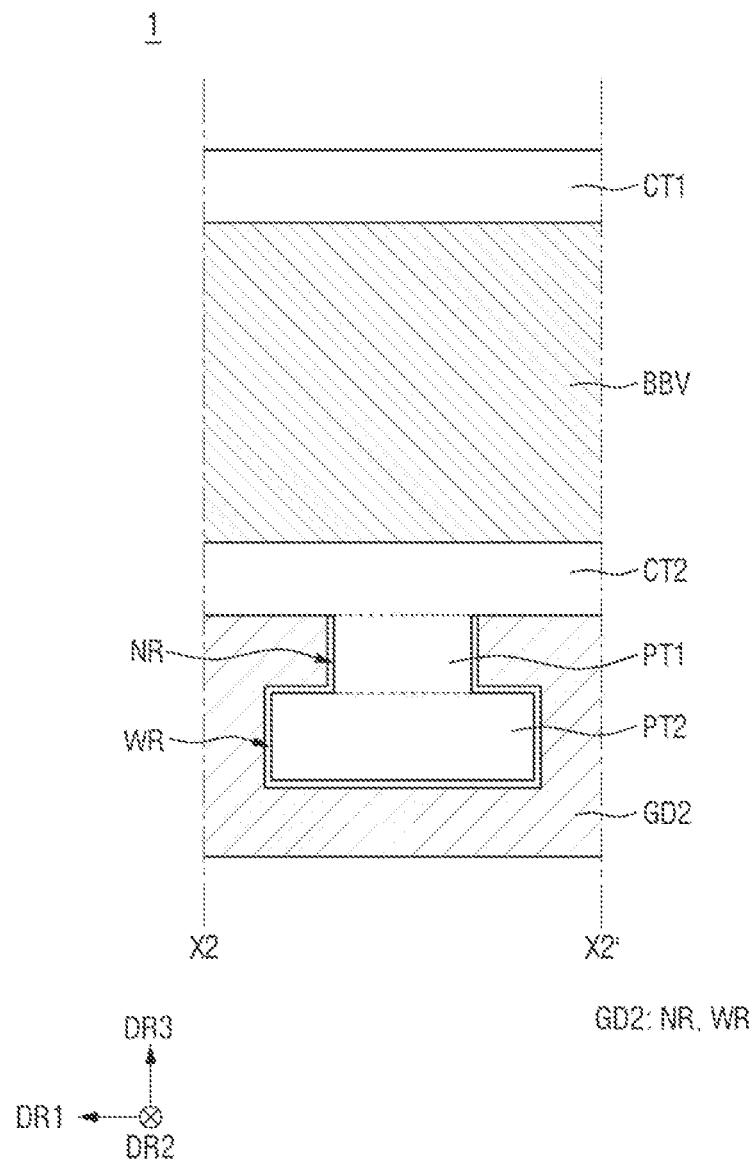

FIGS. 22 to 24 are views for illustrating the fifth connection type CN5 of FIG. 20, and specifically, views showing a fixing member for fixing a lower gear BBV of a lower link BLK to an upper gear UBV of an upper link ULK engaged with a guide rail GD. FIG. 24 is a cross-sectional view, taken along line X2-X2' of FIG. 23.

Referring to FIGS. 22 to 24, the fifth connection type CN5 is substantially identical to the first connection type CN1 except that a protrusion is formed on the lower surface of the fixing members CT1 and CT2 for fixing the lower gear BBV to the upper gear UBV. That is to say, the rotational motions of the lower link BLK and the upper link ULK described above with reference to the first connection type CN1 may be equally applied to the fifth connection type CN5.

The fifth connection type CN5 may include a first fixing member CT1 and a second fixing member CT2. The first fixing member CT1 may be disposed on the upper surface of the lower gear BBV and the upper surface of the upper gear UBV (or the upper surface of the upper plate UPL) to fix the lower gear BBV to the upper gear UBV, and the second fixing member CT2 may be disposed on the lower surface of the lower gear BBV and the lower surface of the upper gear UBV (or the lower surface of the upper plate UPL) to fix the lower gear BBV to the upper gear UBV. A first protrusion PT1 having a cylindrical shape with a relatively small diameter may be disposed on the lower surface of the second fixing member CT2, and a second protrusion PT2 having a cylindrical shape with a relatively large diameter may be disposed on the lower surface of the first protrusion PT1. For example, the diameter of the second protrusion PT2 may be larger than that of the first protrusion PTL.

Accordingly, the first protrusion PT1 and the second protrusion PT2 may be engaged with the first and second grooves NR and WR formed in the guide rail GD, respectively. For example, the width of the first groove NR in the first direction DR1 is relatively small compared to the width of the second groove WR in the first direction DR1 and is substantially similar to the diameter of the first protrusion PT1, and thus the first groove NR and the first protrusion PT1 may be engaged with each other. The diameter of the second protrusion PT2 is relatively large compared to the diameter of the first protrusion PT1 and is substantially similar to the width of the second groove WR in the first direction DR1, and thus the second groove WR and the second protrusion PT2 may be engaged with each other.

Accordingly, the upper gear UBV disposed at the one end of the second upper link of the first lower expandable part 221 in the other direction and the lower gear BBV disposed at the opposite of the first lower link of the second lower expandable part 223 in the one direction, and the lower gear BBV disposed at the one end of the second lower link of the first lower expandable part 221 in the one direction and the upper gear BBV disposed at the opposite end of the first upper link of the second lower expandable part 223 in the other direction, which are connected in the fifth connection type CN5, are connected (e.g., engaged) with the first groove NR and the second groove WR of the guide rail GD, and can move in the first direction DR1 without deviating from the guide rail GD in the second direction DR2. Accordingly, the stability of the sliding behavior of the display device 1 can be increased.

Incidentally, the sixth connection type CN6 is substantially identical to the third connection type CN3 except that protrusions are formed and the protrusions are engaged with the first groove NR and the second groove WR of the guide rail GD like the fifth connection type CN5.

Accordingly, the upper gear UBV disposed at the one end of the second upper link of the second lower expandable part 223 in the other direction and the first lower connecting portion 271 and the lower gear BBV disposed at the one end of the second lower link of the second lower expandable part 223 in the one direction and the second lower connecting portion 272, which are connected in the sixth connection type CN6, are engaged with the first groove NR and the second groove WR of the guide rail GD and can move in the first direction DR1 without deviating from the guide rail GD in the second direction DR2. Accordingly, the stability of the sliding behavior of the display device 1 can be increased.

Hereinafter, the structure of the gear driver 300 that moves the upper expandable part 210 and the lower expandable part 220 will be described.

Figure 25:
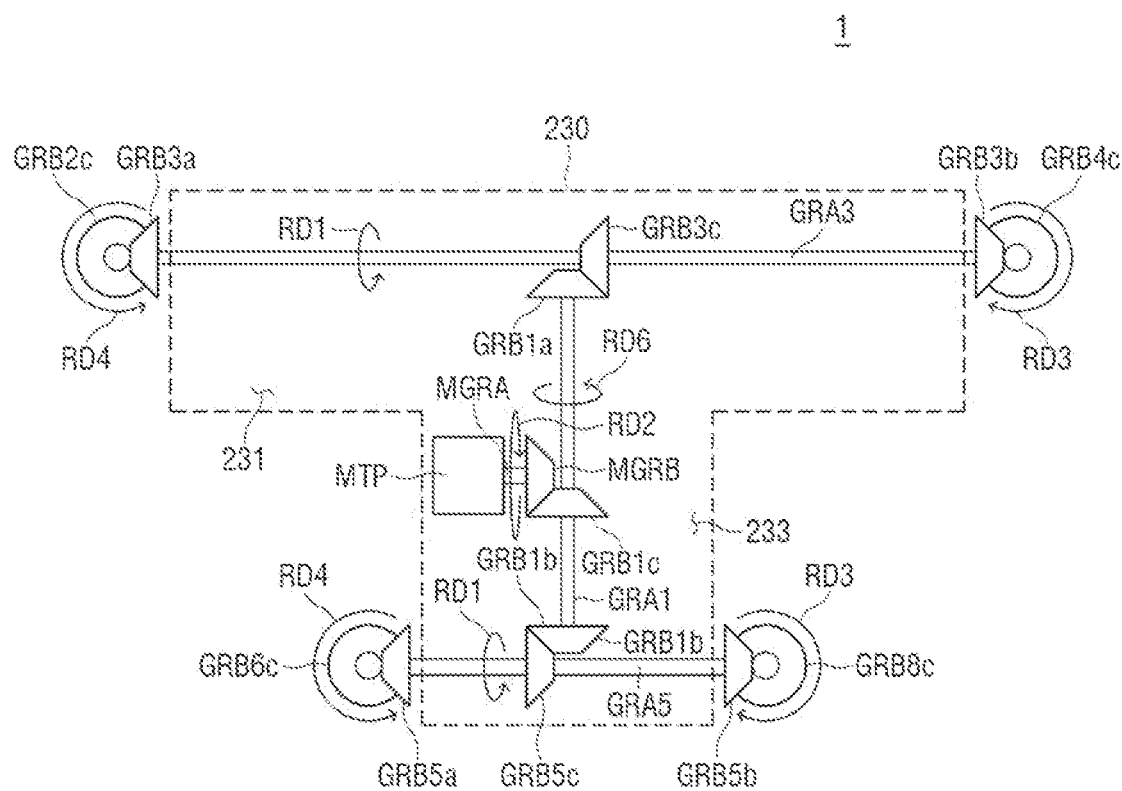
FIGS. 25, 26 and 27 are views for illustrating the structure of a gear driver of a display device according to an embodiment of the present invention.
Figure 25:
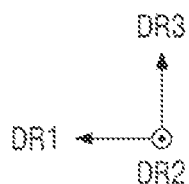
Figure 26:
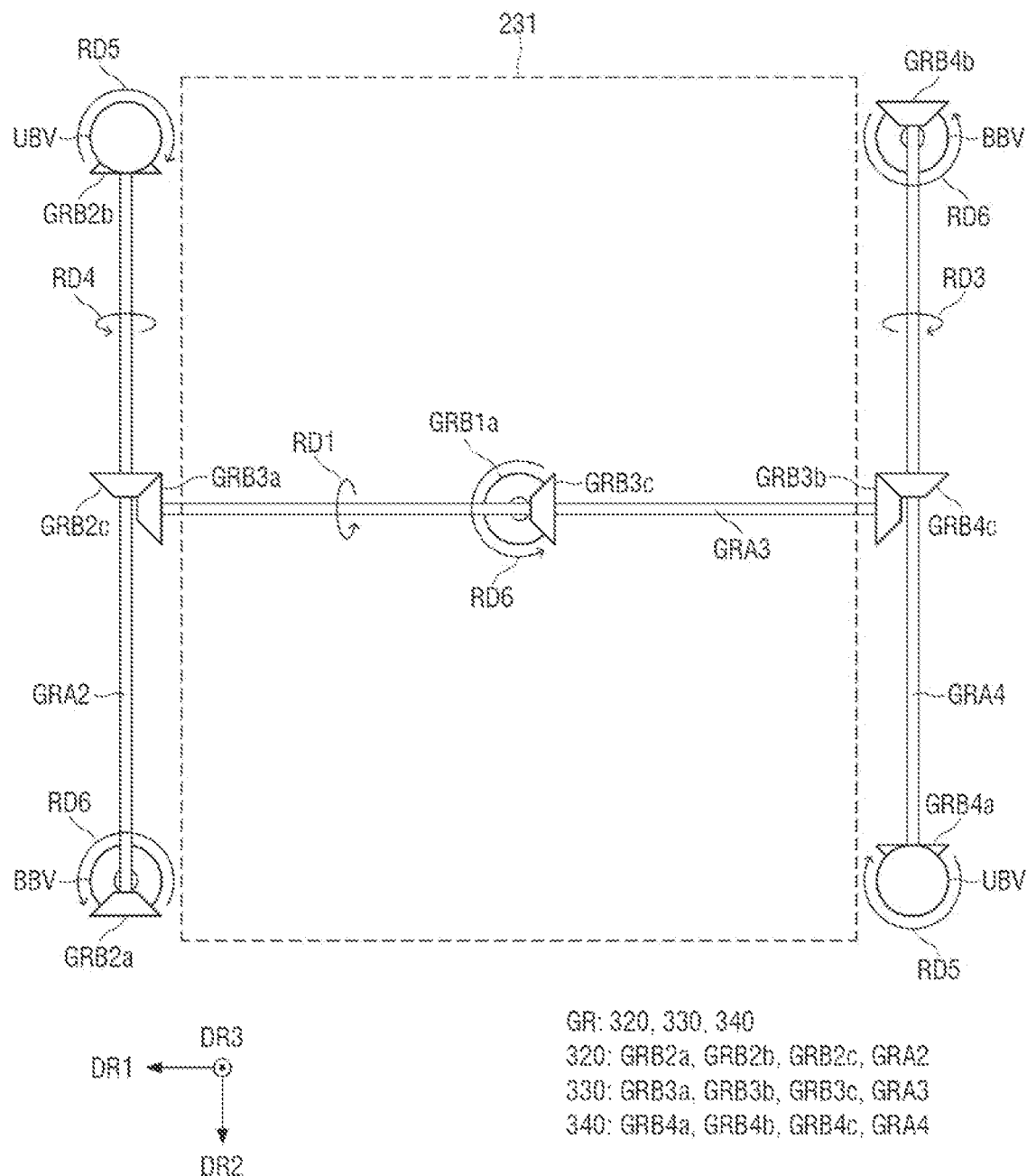
Figure 27:
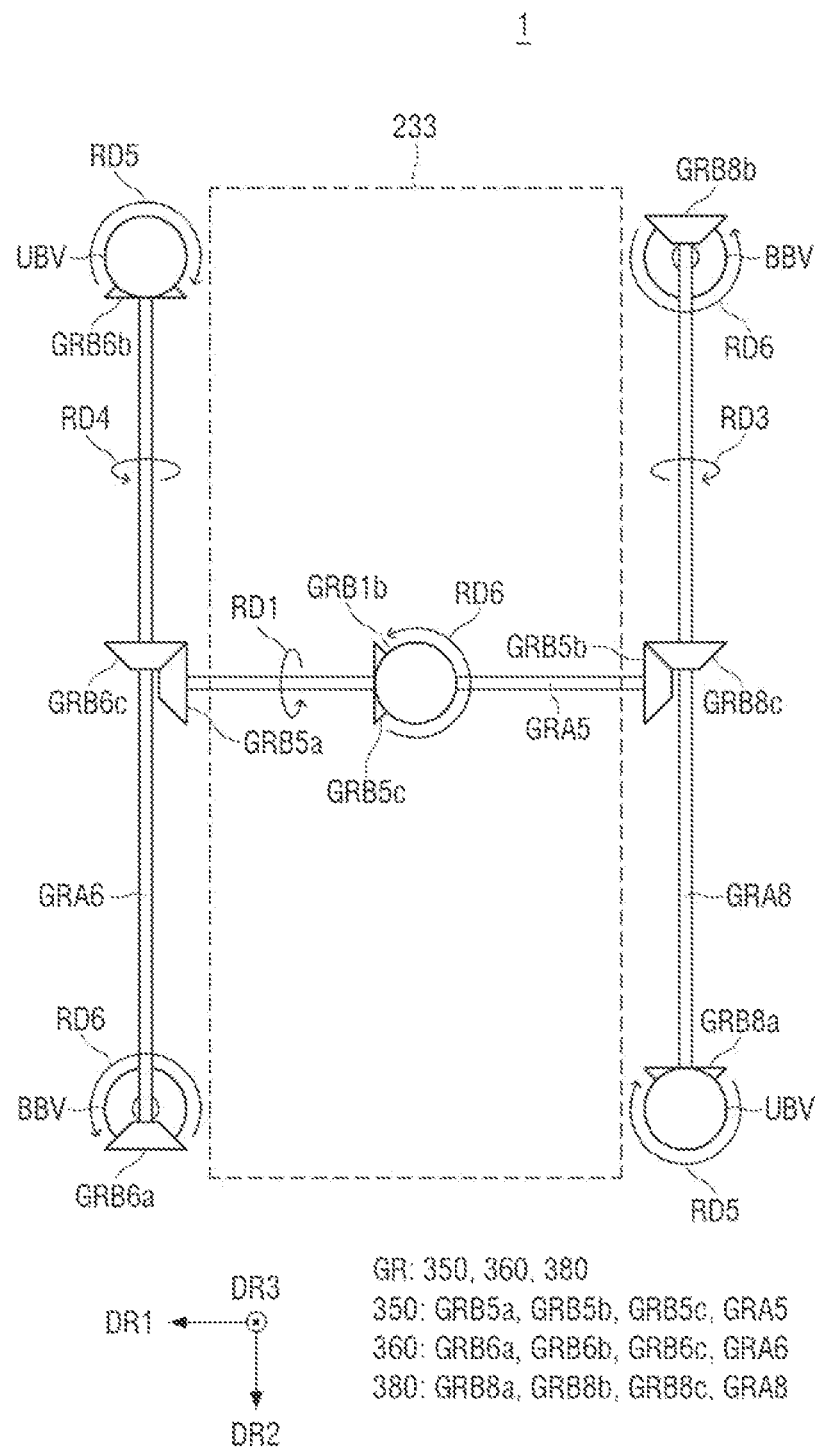

FIGS. 25 to 27 are views for illustrating the structure of a gear driver of a display device according to an embodiment of the present invention.

Referring to FIGS. 25 to 27, the gear driver 300 may be included in a central part 230 of a sliding module and may include a motor unit MT and a plurality of gear units GR. The gear units GR may include a first gear unit 310, a second gear unit 320, a third gear unit 330, a fourth gear unit 340, a fifth gear unit 350, a sixth gear unit 360, and an eighth gear unit 380.

The motor unit MT of the gear driver 300 may provide power to the plurality of gear units GR so that the sliding behavior of the display device 1 can be powered. The motor unit MT may include a motor MTP, a motor shaft MGRA, and a motor bevel gear MGRB.

The motor MTP of the motor unit MT may generate rotational power to the plurality of gear units GR. In an embodiment of the present invention, the motor MTP may be, but is not limited to, an electric motor.

The motor shaft MGRA of the motor unit MT may be rotated by the rotational motion of the motor MTP to transmit the rotational power of the motor MTP to the motor bevel gear MGRB. The motor shaft MGRA may have a cylindrical shape extended in the first direction DR1.

The motor bevel gear MGRB may have a shape that becomes narrower in the first direction DR1 toward the opposite side. The motor bevel gear MGRB may be disposed at the opposite end of the motor shaft MGRA in the first direction DR1. The motor bevel gear MGRB may be engaged with the first gear 310 to be described later.

The second gear unit 320, the third gear unit 330 and the fourth gear unit 340 may be included in the upper central portion 231. The fifth gear unit 350, the sixth gear unit 360 and the eighth gear unit 380 may be included in the lower central portion 233, and the first gear unit 310 may cross the upper central portion 231 and the lower central portion 233 in the third direction DR3.

The first gear unit 310 may transmit power from the motor unit MT to the gear units GR included in the upper central portion 231 and the gear units GR included in the lower central portion 233. The first gear unit 310 may include a first gear shaft GRA1, a first one-end driving gear GRB1a, a first opposite-end driving gear GRB1b, and a first central driving gear GRB1c.

The first central driving gear GRB1c may be a bevel gear having a shape that becomes narrower in the third direction DR3 toward the one side. Accordingly, the first central driving gear GRB1c may be engaged with the motor bevel gear MGRB of the motor unit MT to receive power. For example, the motor bevel gear MGRB may be engaged at one side of the first central driving gear GRB1c in the first direction DR1 to receive power.

The first gear shaft GRA1 may rotate along with the rotation of the first central driving gear GRB1c to rotate the first one-end driving gear GRB1a and the first opposite-end driving gear GRB1b. The first gear shaft GRA1 may be extended in the third direction DR3 through upper central portion 231 and the lower central portion 233.

The first one-end driving gear GRB1a may be a bevel gear having a shape that becomes narrower in the third direction DR3 toward the one side, and the first opposite-end driving gear GRB1b may be a bevel gear having a shape that becomes narrower in the third direction DR3 toward the opposite side. The first one-end driving gear GRB1a may be disposed at the one end of the first gear shaft GRA1 in the third direction DR3, and the first opposite-end driving gear GRB1b may be disposed at the opposite end of the first gear shaft GRA1 in the third direction DR3. The first central driving gear GRB1c may be disposed between the first one-end driving gear GRB1a and the first opposite-end driving gear GRB1b.

The third gear unit 330 may transmit power to the second gear unit 320 and the fourth gear unit 340. The third gear unit 330 may include a third gear shaft GRA3, a third one-end driving gear GRB3a, a third opposite-end driving gear GRB3b, and a third central driving gear GRB3c.

The third central driving gear GRB3c may be a bevel gear having a shape that becomes narrower in the first direction DR1 toward the one side. Accordingly, the third central driving gear GRB3c may be engaged with the first one-end driving gear GRB1a to receive power.

The third gear shaft GRA3 may rotate along with the rotation of the third central driving gear GRB3c to rotate the third one-end driving gear GRB3a and the third opposite-end driving gear GRB3b. The third gear shaft GRA3 may be extended in the first direction DR1.

The third one-end driving gear GRB3a may be a bevel gear having a shape that becomes narrower in the first direction DR1 toward the one side, and the third opposite-end driving gear GRB3b may be a bevel hear having a shape that becomes narrower in the first direction DR1 toward the opposite side. The third one-end driving gear GRB3a may be disposed at the one end of the third gear shaft GRA3 in the first direction DR1, and the third opposite-end driving gear GRB3b may be disposed at the opposite end of the third gear shaft GRA3 in the first direction DR1. The third central driving gear GRB3c may be disposed between the third one-end driving gear GRB3a and the first opposite-end driving gear GRB3b.

The second gear unit 320 may drive the upper expandable part 210 disposed on the one side of the central part 230 in the first direction DR1. The second gear unit 320 may include a second gear shaft GRA2, a second one-end driving gear GRB2a, a second opposite-end driving gear GRB2b, and a second central driving gear GRB2c.

The second central driving gear GRB2c may be a bevel gear having a shape that becomes narrower in the second direction DR2 toward the one side. Accordingly, the second central driving gear GRB2c may be engaged with the third one-end driving gear GRB3a to receive power.

The second gear shaft GRA2 may rotate along with the rotation of the second central driving gear GRB2c to rotate the second one-end driving gear GRB2a and the second opposite-end driving gear GRB2b. The second gear shaft GRA2 may be extended in the second direction DR2.

The second one-end driving gear GRB2a may be a bevel gear having a shape that becomes narrower in the second direction DR2 toward the opposite side, and the second opposite-end driving gear GRB2b may be a bevel hear having a shape that becomes narrower in the second direction DR2 toward the one side in the second direction DR2. The second one-end driving gear GRB2a may be disposed at the one end of the second gear shaft GRA2 in the second direction DR2, and the second opposite-end driving gear GRB2b may be disposed at the opposite end of the second gear shaft GRA2 in the second direction DR2. The second central driving gear GRB2c may be disposed between the second one-end driving gear GRB2a and the second opposite-end driving gear GRB2b.

The fourth gear unit 340 may drive the upper expandable part 210 disposed on the opposite side of the central part 230 in the first direction DR1. The fourth gear unit 340 may include a fourth gear shaft GRA4, a fourth one-end driving gear GRB4a, a fourth opposite-end driving gear GRB4b, and a fourth central driving gear GRB4c.

The fourth central driving gear GRB4c may be a bevel gear having a shape that becomes narrower in the second direction DR2 toward the one side. Accordingly, the fourth central driving gear GRB4c may be engaged with the third the opposite-end driving gear GRB3b to receive power.

The fourth gear shaft GRA4 may rotate along with the rotation of the fourth central driving gear GRB4c to rotate the second one-end driving gear GRB2a and the fourth opposite-end driving gear GRB4b. The fourth gear shaft GRA4 may be extended in the second direction DR2.

The fourth one-end driving gear GRB4a may be a bevel gear having a shape that becomes narrower in the second direction DR2 toward the one side, and the fourth opposite-end driving gear GRB4b may be a bevel hear having a shape that becomes narrower in the second direction DR2 toward the one side. The fourth one-end driving gear GRB4a may be disposed at the one end of the fourth gear shaft GRA4 in the second direction DR2, and the fourth opposite-end driving gear GRB4b may be disposed at the opposite end of the fourth gear shaft GRA2 in the second direction DR2. The fourth central driving gear GRB4c may be disposed between the fourth one-end driving gear GRB4a and the fourth opposite-end driving gear GRB4b.

The fifth gear unit 350 may transmit power to the sixth gear unit 360 and the eighth gear unit 380. The fifth gear unit 350 may include a fifth gear shaft GRA5, a fifth one-end driving gear GRB5a, a fifth opposite-end driving gear GRB5b, and a fifth central driving gear GRB5c.

The fifth central driving gear GRB5c may be a bevel gear having a shape that becomes narrower in the second direction DR2 toward the opposite side. Accordingly, the fifth central driving gear GRB5c may be engaged with the first opposite-end driving gear GRB1b to receive power.

The fifth gear shaft GRA5 may rotate along with the rotation of the fifth central driving gear GRB5c to rotate the fifth one-end driving gear GRB5a and the fifth opposite-end driving gear GRB5b. The fifth gear shaft GRA5 may be extended in the first direction DR1.

The fifth one-end driving gear GRB5a may be a bevel gear having a shape that becomes narrower in the second direction DR2 toward the one side, and the fifth opposite-end driving gear GRB5b may be a bevel hear having a shape that becomes narrower in the second direction DR2 toward the opposite side. The fifth one-end driving gear GRB5a may be disposed at the one end of the fifth gear shaft GRA5 in the first direction DR1, and the fifth opposite-end driving gear GRB5b may be disposed at the opposite end of the fifth gear shaft GRA5 in the first direction DR1. The fifth central driving gear GRB5c may be disposed between the fifth one-end driving gear GRB5a and the fifth opposite-end driving gear GRB5b.

The sixth gear unit 360 may drive the lower expandable part 220 disposed on the one side of the central part 230 in the first direction DR1. The sixth gear unit 360 may include a sixth gear shaft GRA6, a sixth one-end driving gear GRB6a, a third opposite-end driving gear GRB6b, and a sixth central driving gear GRB6c.

The sixth central driving gear GRB6c may be a bevel gear having a shape that becomes narrower in the second direction DR2 toward the one side. Accordingly, the sixth central driving gear GRB6c may be engaged with the fifth one-end driving gear GRB5a to receive power.

The sixth gear shaft GRA6 may rotate along with the rotation of the sixth central driving gear GRB6c to rotate the sixth one-end driving gear GRB6a and the sixth opposite-end driving gear GRB6b. The sixth gear shaft GRA6 may be extended in the second direction DR2.

The sixth one-end driving gear GRB6a may be a bevel gear having a shape that becomes narrower in the second direction DR2 toward the opposite side, and the sixth opposite-end driving gear GRB6b may be a bevel hear having a shape that becomes narrower in the second direction DR2 toward the one side. The sixth one-end driving gear GRB6a may be disposed at the one end of the sixth gear shaft GRA6 in the second direction DR2, and the sixth opposite-end driving gear GRB6b may be disposed at the opposite end of the sixth gear shaft GRA6 in the second direction DR2. The sixth central driving gear GRB6c may be disposed between the sixth one-end driving gear GRB6a and the sixth opposite-end driving gear GRB6b.

The eighth gear unit 380 may drive the lower expandable part 220 disposed on the opposite side of the central part 230 in the first direction DR1. The eighth gear unit 380 may include an eighth gear shaft GRA8, an eighth one-end driving gear GRB8a, an eighth opposite-end driving gear GRB8b, and an eighth central driving gear GRB8c.

The eighth central driving gear GRB8c may be a bevel gear having a shape that becomes narrower in the second direction DR2 toward the one side. Accordingly, the eighth central driving gear GRB8c may be engaged with the fifth the opposite-end driving gear GRB5b to receive power.

The eighth gear shaft GRA8 may rotate along with the rotation of the eighth central driving gear GRB8c to rotate the eighth one-end driving gear GRB8a and the eighth opposite-end driving gear GRB8b. The eighth gear shaft GRA8 may be extended in the second direction DR2.

The eighth one-end driving gear GRB8a may be a bevel gear having a shape that becomes narrower in the second direction DR2 toward the one side, and the eighth opposite-end driving gear GRB8b may be a bevel hear having a shape that becomes narrower in the second direction DR2 toward the one side. The eighth one-end driving gear GRB8a may be disposed at the one end of the eighth gear shaft GRA8 in the second direction DR2, and the eighth opposite-end driving gear GRB8b may be disposed at the opposite end of the eighth gear shaft GRA8 in the second direction DR2. The eighth central driving gear GRB8c may be disposed between the eighth one-end driving gear GRB8a and the eighth opposite-end driving gear GRB8b.

With the above-described configurations, the gear driver 300 according to the embodiment is driven by the single motor MTP, and thus the upper expandable parts 210 and the lower expandable parts 220 expand at the same time, so that the surface quality of the display module 100 can be increased regardless of the sliding behavior of the display device 1.

Hereinafter, the behaviors of the upper expandable parts 210 and the lower expandable parts 220 according to the driving of the gear driver 300 will be described.

Figure 28:
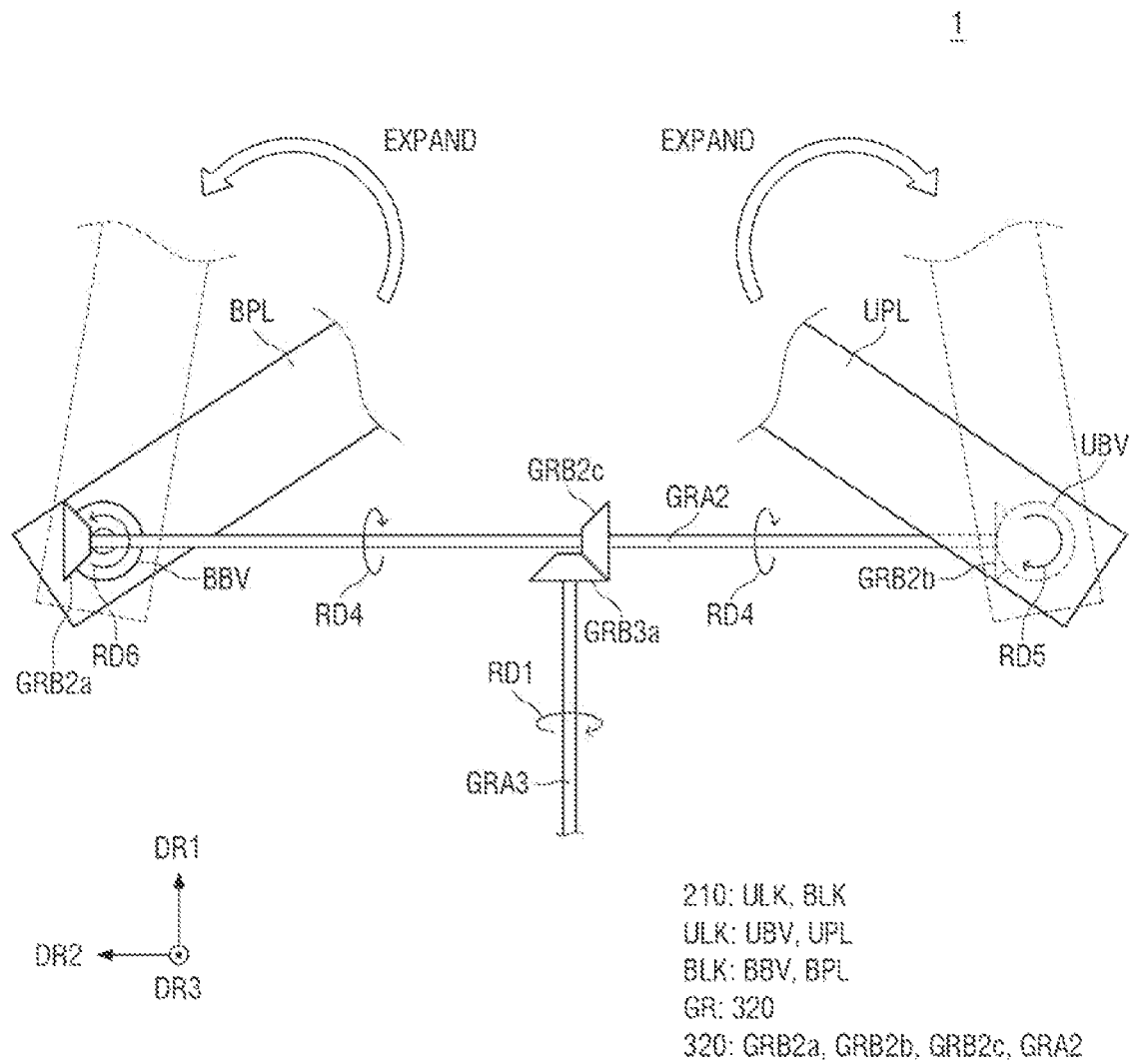
FIGS. 28 and 29 are views for illustrating the behavior of the upper link and the lower link of the upper expandable part according to the driving of the second gear unit according to an embodiment of the present invention.
Figure 29:
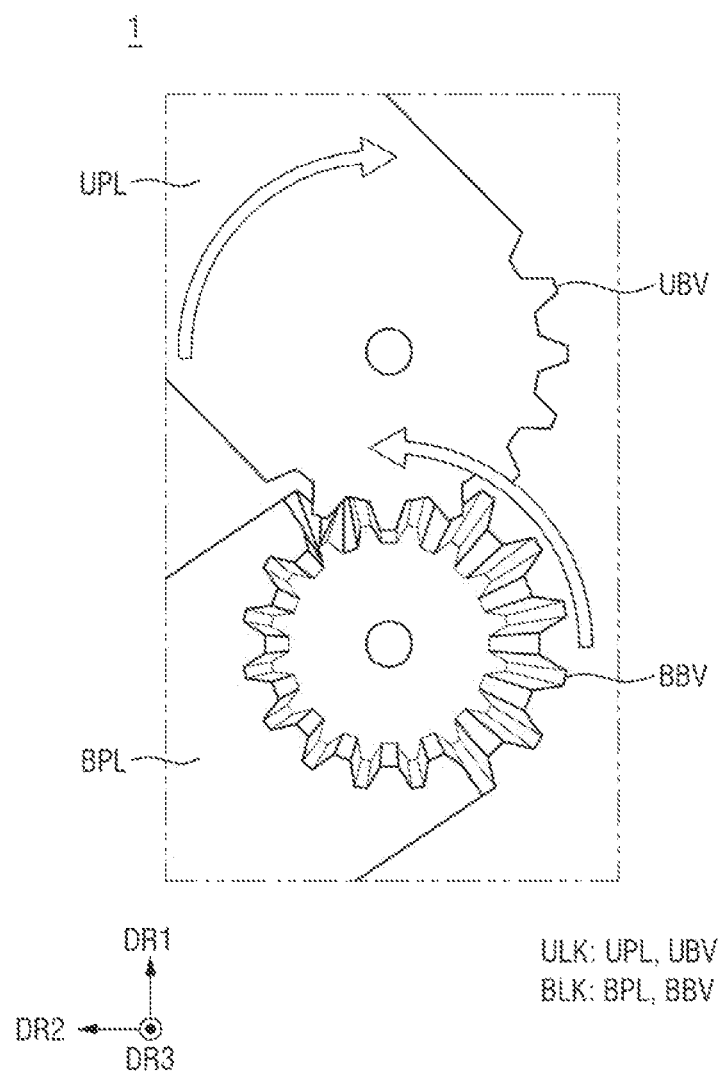
Figure 30:
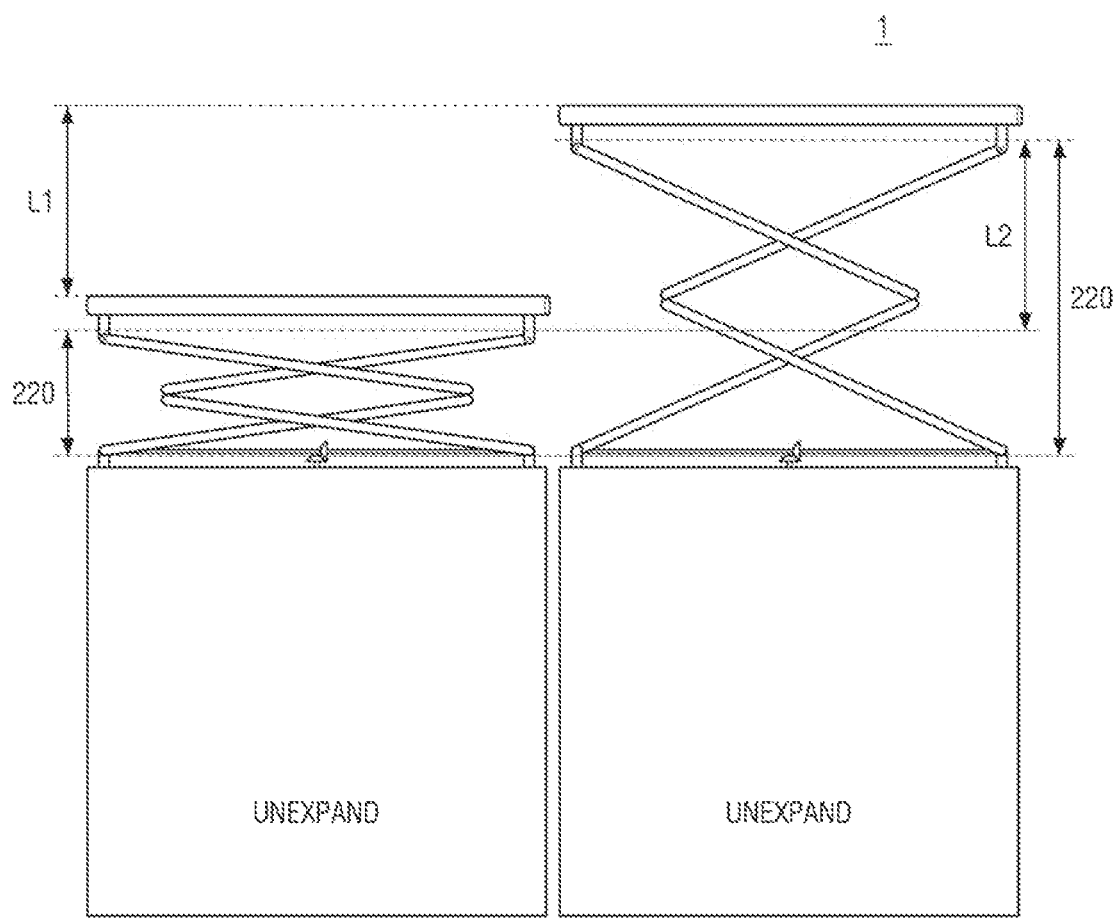
FIG. 30 is a view for illustrating a sliding behavior of an upper expandable part of a display device according to an embodiment of the present invention.
Figure 31:
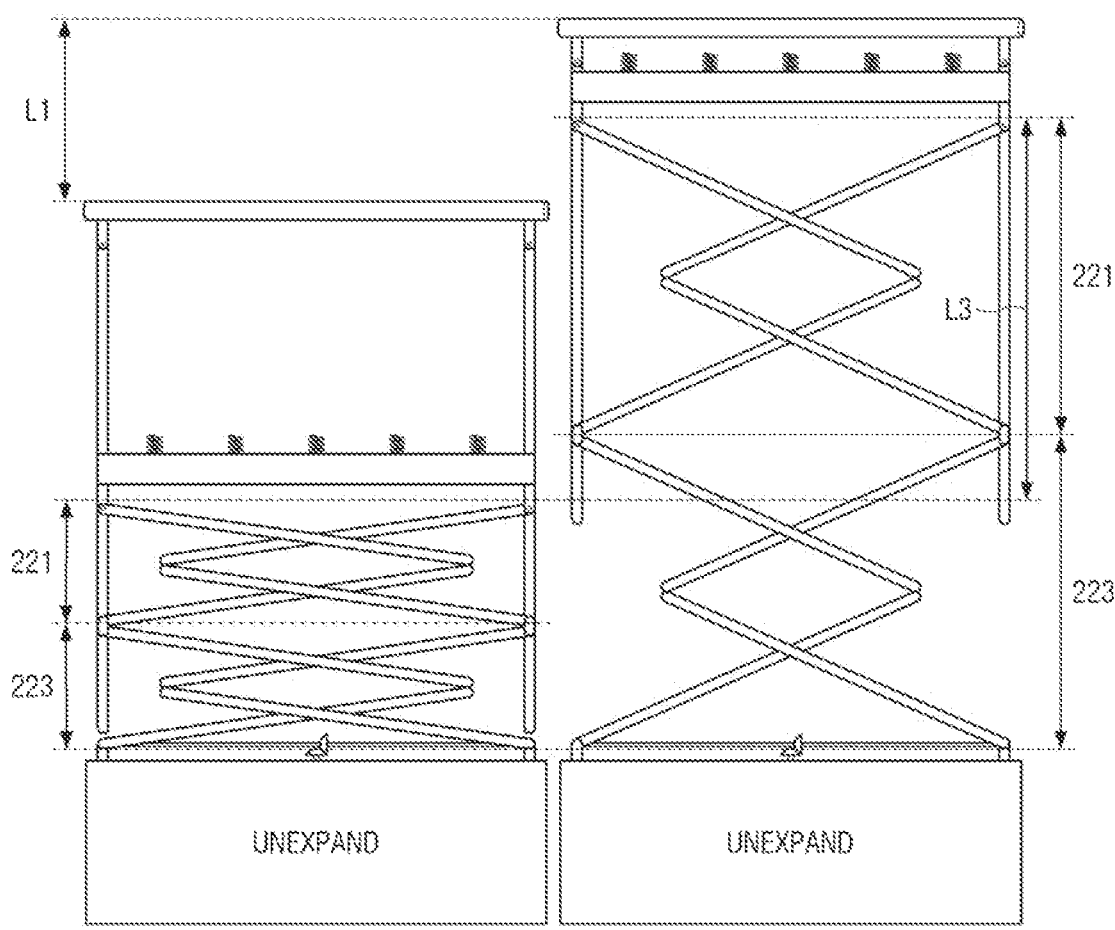
FIG. 31 is a view for illustrating a sliding behavior of a lower expandable part of a display device according to an embodiment of the present invention.

FIGS. 28 and 29 are views for illustrating the behavior of the upper link and the lower link of the upper expandable part according to the driving of the second gear unit according to an embodiment of the present invention. FIG. 30 is a view for illustrating a sliding behavior of an upper expandable part of a display device according to an embodiment of the present invention. FIG. 31 is a view for illustrating a sliding behavior of a lower expandable part of a display device according to an embodiment of the present invention.

Referring to FIGS. 28 to 31 in conjunction with FIGS. 25 to 27, a first rotation direction RD1, a second rotation direction RD2, a third rotation direction RD3, a fourth rotation direction RD4, a fifth rotation direction RD5, and a sixth rotation direction RD6 are defined in FIGS. 25 to 27. The first rotation direction RD1 may be a clockwise direction when viewed from the one side in the first direction DR1. The second rotation direction RD2 may be a counter-clockwise direction when viewed from the one side in the first direction DR1. The third rotation direction RD3 may be a clockwise direction when viewed from the one side in the second direction DR2. The fourth rotation direction RD4 may be a counterclockwise direction when viewed from the one side in the second direction DR2. The fifth rotation direction RD5 may be a clockwise direction when viewed from the one side in the third direction DR3, and the sixth rotation direction RD6 may be a counterclockwise direction when viewed from the one side in the third direction DR3.

In the following description, it is assumed that the motor bevel gear MGRB is rotated in the second rotation direction RD2 so that the display device 1 expands for convenience of illustration.

When the motor bevel gear MGRB rotates in the second rotation direction RD2, the motor bevel gear MGRB is engaged with the one side of the first central driving gear GRB1c in the first direction DR1 so that the first gear unit 310 rotates in the sixth rotation direction RD6, the first one-end driving gear GRB1a is engaged with the opposite side of the third central driving gear GRB3c so that the third gear unit 330 rotates in the first rotation direction RD1, and the first opposite-end driving gear GRB1b is engaged with the one side of the fifth central driving gear GRB5c in the third direction DR3 so that the fifth gear unit 350 rotates in the first rotation direction RDL.

When the third gear unit 330 rotates in the first rotation direction RD1, the third one-end driving gear GRB3a is engaged with the opposite side of the second central driving gear GRB2c in the first direction DR1 so that the second gear unit 320 rotates in the fourth rotation direction RD4. In this instance, since the upper gear UBV and the second opposite-end driving gear GRB2b of the upper expandable part 210 are engaged with each other on the one side of the upper gear UBV of the upper expandable part 210 in the second direction DR2, the upper gear UBV of the upper expandable part 210 rotates in the fifth rotation direction RD5. Since the lower gear BBV and the second one-end driving gear GRB2a of the upper expandable part 210 are engaged with each other on the one side of the lower gear BBV of the upper expandable part 210 in the second direction DR2, the lower gear BBV of the upper expandable part 210 rotates in the sixth rotation direction RD6. Accordingly, the upper expandable part 210 located on the one side of the central part 230 in the first direction DR1 expands toward the one side in the first direction DR1, as shown in FIGS. 28 and 29.

Likewise, when the third gear unit 330 rotates in the first rotation direction RD1, the third opposite-end driving gear GRB3b is engaged with the one side of the fourth central driving gear GRB4c in the first direction DR1 so that the fourth gear unit 340 rotates in the third rotation direction RD3. In this instance, since the lower gear BBV and the fourth opposite-end driving gear GRB4b of the upper expandable part 210 are engaged with each other on the opposite side of the lower gear BBV of the upper expandable part 210 in the second direction DR2, the lower gear UBV of the upper expandable part 210 rotates in the sixth rotation direction RD6. Since the upper gear UBV and the fourth one-end driving gear GRB4a of the upper expandable part 210 are engaged with each other on the opposite side of the upper gear UBV in the second direction DR2, the upper gear UBV of the upper expandable part 210 rotates in the fifth rotation direction RD5. Accordingly, the upper expandable part 210 located on the opposite side of the central part 230 in the first direction DR1 will expand toward the opposite side in the first direction DR1.

In addition, when the fifth gear unit 350 rotates in the first rotation direction RD1, the fifth one-end driving gear GRB5a is engaged with the one side of the sixth central driving gear GRB6c in the first direction DR1 so that the sixth gear unit 360 rotates in the fourth rotation direction RD4. In this instance, since the upper gear UBV and the sixth opposite-end driving gear GRB6*b* of the first lower expandable part 221 are engaged with each other on the one side of the upper gear UBV of the first lower expandable part 221 in the second direction DR2, the upper gear UBV of the first lower expandable part 221 rotates in the fifth rotation direction RD5. Since the lower gear BBV and the sixth one-end driving gear GRB6*a* of the first lower expandable part 221 are engaged with each other on the one side of the lower gear BBV of the first lower expandable part 221 in the second direction DR2, the lower gear BBV of the first lower expandable part 221 rotates in the sixth rotation direction RD6. Accordingly, the first lower expandable part 221 located on the one side of the central part 230 in the first direction DR1 will expand toward the one side in the first direction DR1. The second lower expandable part 223 will also expand toward the one side in the first direction DR1 due to the above-described connection relationship.

Likewise, when the fifth gear unit 350 rotates in the first rotation direction RD1, the fifth opposite-end driving gear GRB5*b* is engaged with the opposite side of the eighth central driving gear GRB8*c* in the second direction DR2 so that the eighth gear unit 380 rotates in the third rotation direction RD3. In this instance, since the lower gear BBV and the eighth opposite-end driving gear GRB8*b* of the first lower expandable part 221 are engaged with each other on the opposite side of the lower gear BBV of the first lower expandable part 221 in the second direction DR2, the lower gear BBV of the first lower expandable part 221 rotates in the sixth rotation direction RD6. Since the upper gear BBV and the eighth one-end driving gear GRB8*a* of the first lower expandable part 221 are engaged with each other on the opposite side of the upper gear UBV of the first lower expandable part 221 in the second direction DR2, the upper gear UBV of the first lower expandable part 221 rotates in the fifth rotation direction RD5. Accordingly, the first lower expandable part 221 located on the opposite side of the central part 230 in the first direction DR1 will expand toward the opposite side in the first direction DR1. The second lower expandable part 223 will also expand toward the opposite side in the first direction DR1.

As described above, the driving gears GRB in the gear driver 300 rotate at the same time by the single motor MTP, and thus the upper expandable part 210 and the lower expandable part 220 expand at the same time, so that the surface quality of the display module 100 can be increased regardless of the sliding behavior of the display device 1. If the motor bevel gear MGRB of the motor unit MT rotates in the second direction DR2, on the contrary, they may contract.

Accordingly, referring to FIGS. 30 and 31, as the driving gears GRB of the gear driver 300, the upper gears UBV of the upper links ULK, and the lower gears BBV of the lower links BLK are engaged with one another, the display device 1 may expand or contract in the first direction DR1 by the operation of the single motor MTP, so that the behavior of the display module 100 described above with reference to FIG. 7 can be conducted.

While the present invention has been described with reference to the embodiments thereof, it will be understood by those of ordinary skill in the art that various changes in form and detail may be made thereto without departing from the spirit and scope of the present invention.

What is claimed is:

1. A display device comprising:
a display module having a flat area and a bendable area, wherein the bendable area has a first side adjacent to the flat area in a first direction; and
a sliding module at least partially surrounded by the display module and configured to slide the display module in the first direction,
wherein the sliding module comprises:
a central part comprising an upper central portion and a lower central portion, wherein the upper central portion is disposed under the flat area of the display module, and the lower central portion is disposed under the upper central portion;
an upper expandable part configured to expand and contract in the first direction and having a first side connected to the upper central portion of the central part;
a roller connected to a second side, opposite to the first side, of the upper expandable part to bend the bendable area of the display module;
a first lower expandable part configured to expand and contract in the first direction and having a first side connected to the lower central portion of the central part; and
a second lower expandable part configured to expand and contract in the first direction and having a first side connected to a second side, opposite to the first side, of the first lower expandable part,
wherein a second side, opposite to the first side, of the second lower expandable part is connected to a second side, opposite to the first side, of the bendable area,
wherein the first lower expandable part directly contacts the second lower expandable part.

2. The display device of claim 1, wherein the display module comprises a display panel for displaying images and a panel support for supporting a lower surface of the display panel,
wherein the display panel comprises:
a first active area;
a second active area adjacent to the first active area in the first direction; and
a dummy area disposed opposite to the first active area with the second active area therebetween,
wherein the panel support comprises:
a main plate supporting the first active area;
a plurality of segments supporting the second active area; and
a sub-plate supporting the dummy area, and
wherein the second side of the second lower expandable part is connected to the sub-plate.

3. The display device of claim 2, wherein the second side of the second lower expandable part and the sub-plate are connected to each other by an elastic member.

4. The display device of claim 3, wherein the sub-plate comprises a through hole penetrating through the sub-plate, and wherein the elastic member is connected to the through hole.

5. The display device of claim 4, wherein an elastic force applied to the elastic member is kept constant according to a sliding behavior of the display module in the first direction.

6. The display device of claim 1, further comprising: a gear driver disposed in the central part and configured to expand and contract each of the upper expandable part, the first lower expandable part and the second lower expandable part in the first direction.

7. The display device of claim 6, wherein an expandable length of the upper expandable part in the first direction, an expandable length of the first lower expandable part in the first direction, and an expandable length of the second lower expandable part in the first direction are substantially all equal to one another.

8. The display device of claim 7, wherein the gear driver comprises:
a motor unit;
a first gear unit disposed at the upper central portion;
a second gear unit disposed at the lower central portion; and
a third gear unit connected to the motor unit and configured to transmit power to the first gear unit and the second gear unit,
wherein the first gear unit is connected to the first side of the upper expandable part and configured to expand and contract the upper expandable part in the first direction, and
wherein the second gear unit is connected to the first side of the first lower expandable part to expand and contract the first lower expandable part and the second lower expandable part in the first direction.

9. The display device of claim 8, wherein each of the upper expandable part, the first lower expandable part and the second lower expandable part comprises a plurality of lower links and a plurality of upper links,
wherein each of the plurality of lower links comprises a lower plate extended in one direction, a first lower gear disposed at first end of the lower plate in the one direction and protruding from an upper surface of the lower plate, and a second lower gear disposed at a second end, opposite to the first end, in the one direction and protruding from the upper surface of the lower plate,
wherein each of the plurality of upper links comprises an upper plate extended in another direction crossing the one direction, a first upper gear disposed at a first end of the upper plate in the other direction and protruding from a lower surface of the upper plate, and a second upper gear disposed at a second end, opposite to the first end, in the other direction and protruding from the lower surface of the upper plate,
wherein the upper expandable part, the first lower expandable part and the second lower expandable part comprise a same number of lower links as one another, and
wherein the upper expandable part, the first lower expandable part and the second lower expandable part comprise a same number of upper links as one another.

10. The display device of claim 9, wherein the plurality of lower links comprises a first lower link and a second lower link spaced apart from each other in the first direction,
wherein the plurality of upper links comprises a first upper link and a second upper link spaced apart from each other in the first direction,
wherein the first lower link and the first upper link cross each other, wherein the second lower link and the second upper link cross each other,
wherein the first lower gear of the first lower link is engaged with the second upper gear of the second upper link, and
wherein the first upper gear of the first upper link is engaged with the second lower gear of the second lower link.

11. The display device of claim 10, further comprising:
a panel connecting member configured to connect the second side of the bendable area of the display module with the second side of the second lower expandable part,
wherein the upper expandable part is configured such that a first side of the second lower link in the one direction and a first side of the second upper link in the other direction are fixed to the roller, and the second lower gear of the first lower link and the second upper gear of the first upper link are engaged with the first gear unit,
wherein the first lower expandable part is configured such that the second lower gear of the first lower link and the second upper gear of the first upper link are engaged with the second gear unit,
wherein the second lower expandable part is configured such that the first side of the second lower link in the one direction and the first side of the second upper link in the other direction are fixed to the panel connecting member,
wherein the second lower gear of the first lower link of the second lower expandable part is engaged with the first upper gear of the second upper link of the first lower expandable part, and
wherein the second upper gear of the first upper link of the second lower expandable part is engaged with the first lower gear of the second lower link of the first lower expandable part.

12. The display device of claim 11, further comprising:
a first fixing member configured to fix the second lower gear of the first lower link of the second lower expandable part to the first upper gear of the second upper link of the first lower expandable part; and
a second fixing member configured to fix the second upper gear of the first upper link of the second lower expandable part to the first lower gear of the second lower link of the first lower expandable part.

13. The display device of claim 12, further comprising:
a guide rail fixed to the roller and extended in the first direction,
wherein the first fixing member and the second fixing member are engaged with the guide rail.

14. The display device of claim 10, wherein a first angle of intersection formed by the first lower link and the first upper link of the upper expandable part, a second angle of intersection formed by the first lower link and the first upper link of the first lower expandable part, and a third angle of intersection formed by the first lower link and the first upper link of the second lower expandable part are substantially all equal to each other.

15. The display device of claim 14, wherein a rate of change of the first angle of intersection, a rate of change of the second angle of intersection, and a rate of change of the third angle of intersection that change according to a sliding behavior of the display module in the first direction are substantially all equal to each other.

16. A display device comprising:
a display module having a flat area and a bendable area, wherein the bendable area has a first side adjacent to the flat area in a first direction; and
a sliding module at least partially surrounded by the display module and configured to slide the display module in the first direction,
wherein the sliding module comprises:
a central part comprising an upper central portion and a lower central portion, wherein the upper central portion is disposed under the flat area of the display module, and the lower central portion is disposed under the upper central portion;
an upper expandable part configured to expand and contract in the first direction and having a first side connected to the upper central portion of the central part;
a roller connected to a second side, opposite to the first side, of the upper expandable part and configured to bend the bendable area of the display module; and a lower expandable part configured to expand and contract in the first direction and having a first side connected to the lower central portion of the central part, wherein a second side, opposite to the first side, of the lower expandable part is connected to a second side, opposite to the first side, of the bendable area, and wherein an expandable length of the lower expandable part in the first direction is greater than an expandable length of the upper expandable part in the first direction.

17. The display device of claim 16, wherein the expandable length of the lower expandable part in the first direction is twice the expandable length of the upper expandable part in the first direction.

18. The display device of claim 17, wherein the display module comprises a display panel for displaying images, and a panel support for supporting the display panel, wherein the display panel comprises:

a first active area;

a second active area adjacent to the first active area in the first direction; and a dummy area disposed opposite to the first active area with the second active area therebetween, wherein the panel support comprises:

a main plate supporting the first active area;

a plurality of segments supporting the second active area; and a sub-plate supporting the dummy area, and wherein the second side of the lower expandable part is connected to the sub-plate.

19. The display device of claim 18, wherein the second side of the lower expandable part and the sub-plate are connected with each other by an elastic member.

20. The display device of claim 19, wherein an elastic force applied to the elastic member is kept constant according to a sliding behavior of the display module in the first direction.

* * * * *